(12) United States Patent
Madden et al.

(10) Patent No.: US 6,801,821 B2
(45) Date of Patent: Oct. 5, 2004

(54) ASSEMBLY LINE CONTROL SYSTEM

(75) Inventors: Rick Madden, Oro Station (CA); Jeff French, New Lowell (CA)

(73) Assignee: Honda Canada Incorporated, Scarborough (CA)

( * ) Notice: Subject to any disclaimer, the term of this patent is extended or adjusted under 35 U.S.C. 154(b) by 0 days.

(21) Appl. No.: 10/232,442

(22) Filed: Aug. 29, 2002

(65) Prior Publication Data

US 2002/0198618 A1 Dec. 26, 2002

Related U.S. Application Data

(62) Division of application No. 09/368,256, filed on Aug. 3, 1999, now abandoned, and a division of application No. 09/368,254, filed on Aug. 3, 1999, now Pat. No. 6,516,239.

(51) Int. Cl.$^7$ .......................... G06F 7/00; G06F 19/00
(52) U.S. Cl. ................... 700/101; 700/115; 700/166
(58) Field of Search .................... 700/101, 115, 700/166, 223–226

(56) References Cited

U.S. PATENT DOCUMENTS

| | | | |
|---|---|---|---|
| 4,683,651 A | | 8/1987 | Taketani et al. |
| 4,958,292 A | * | 9/1990 | Kaneko et al. ............. 700/106 |
| 5,056,028 A | | 10/1991 | Ohta et al. |
| 5,088,045 A | | 2/1992 | Shiminaka et al. |
| 5,236,156 A | * | 8/1993 | Zimmermann ............. 246/5 |
| 5,341,304 A | | 8/1994 | Sakamoto et al. |
| 5,377,814 A | | 1/1995 | Smith et al. |
| 5,434,792 A | | 7/1995 | Saka et al. |
| 5,442,561 A | | 8/1995 | Yoshizawa et al. |
| 5,612,886 A | | 3/1997 | Weng |
| 5,699,242 A | | 12/1997 | Togawa et al. |
| 5,706,213 A | | 1/1998 | Takakura et al. |
| 5,787,002 A | | 7/1998 | Iwamoto et al. |
| 5,794,213 A | | 8/1998 | Markman |
| 5,950,149 A | | 9/1999 | Fieramosca et al. |
| 5,979,635 A | * | 11/1999 | Calhoun ............. 198/456 |
| 6,012,894 A | | 1/2000 | Watanabe et al. |
| 6,027,022 A | | 2/2000 | Hong |
| 6,036,087 A | | 3/2000 | Hong et al. |
| 6,059,091 A | * | 5/2000 | Maier et al. ............. 198/349.6 |
| 6,141,598 A | | 10/2000 | Nam |
| 6,240,328 B1 | | 5/2001 | LaLonde et al. |
| 6,411,859 B1 | * | 6/2002 | Conboy et al. ............. 700/101 |
| 6,522,943 B2 | * | 2/2003 | Dierauer ............. 700/223 |

FOREIGN PATENT DOCUMENTS

| | | |
|---|---|---|
| CA | 1264219 | 1/1990 |
| CA | 2202808 | 6/1998 |
| EP | 0 308 248 A2 | 9/1988 |
| EP | 0 598 978 A3 | 3/1993 |
| EP | 0 669 698 A1 | 1/1995 |
| GB | 2 187 683 A | 9/1987 |
| JP | 7178639 | 7/1995 |

* cited by examiner

Primary Examiner—Leo Picard
Assistant Examiner—Elliott Frank
(74) Attorney, Agent, or Firm—Christensen O'Connor Johnson Kindness PLLC

(57) ABSTRACT

An assembly line control system, and more particularly, an automotive assembly line storage and lot controlled system is disclosed. A communications network is overlaid onto a manufacturing assembly line. The assembly line includes a number of readers and processing stations to determine and confirm the identity of vehicles passing proximate to the readers and processing stations, and the vehicles' build instructions, status, position, condition, defect and repair history, etc. This information is stored in a computer database. Based on the information stored about the vehicles, the status of inventories, production schedules and the like, a routing of the vehicles through the manufacturing process is determined and implemented. The assembly line incorporates various storage loop and shunting lanes so that members of a lot of vehicles, having similar build instructions, are more likely to be placed into contact with each other, reducing possible parts changeovers, meeting production schedules, accommodating a shortfall in parts availability, etc.

16 Claims, 16 Drawing Sheets

ASSEMBLY LINE CONTROL SYSTEM

CROSS-REFERENCE TO RELATED APPLICATION

This application is a divisional of application Ser. No. 09/368,254, filed Aug. 3, 1999, U.S. Pat. No. 6,516,239, by inventors Rick Madden et al. This application is division to a United States patent application for an invention entitled Zone Inspection Manufacturing Line, filed Aug. 3, 1999, Ser. No. 09/368,256, now abandoned, the inventor is Marc Aston; and the contents of which are hereby incorporated herein by reference.

FIELD OF THE INVENTION

The invention relates to an assembly line control system and, more particularly, to an automotive assembly line storage and lot control system.

BACKGROUND OF THE INVENTION

In conventional assembly lines, and automotive assembly lines in particular, a continuous feed of partially completed assemblies, such as an automobile, is passed through, typically, a large number of assembly stations. Each assembly, or vehicle as the case may be, typically has an instruction or build sheet associated with the particular assembly. The build sheet includes instructions as to the processes that need to be performed, and the locations to which the assembly should be transported. The build sheet is typically a print out of a computer record for a particular vehicle that is attached, directly or indirectly, to the vehicle. A vehicle also has associated with it an assembly sheet. The assembly sheet identifies the various parts or components that must be installed for the particular vehicle to which the assembly sheet is associated. Consequently, the assembly sheet identifies the parts that are to be installed and the build sheet contains the instructions as to where and what processes are to be used in putting the parts identified on the assembly sheet together.

Recently the automotive industry has embraced two disparate manufacturing technologies: just-in-time (JIT) production and mass customization.

JIT production involves the co-ordination of parts supplies to the manufacturing plant and to "line side" (that is, locations physically proximate to the manufacturing assembly line making parts available for installation on/in the assembly) in an effort to reduce inventories and, consequently, costs. As is known in the art, JIT production may require several shipments of the same part, component or assembly, from the supplier (which may, for example, be another plant of the assembly manufacturer, another assembly line in the same manufacturing plant, or a separate or outside parts supplier, such as the Tier I suppliers to the large automobile manufacturers like Honda™). These parts shipments may and often are, due to manufacturing or delivery difficulties, delayed in their arrival at the manufacturing plant. As a result of these delays, and the associated low inventory problems, it is not uncommon for the delay in a single day's shipments or even a single shipment of parts to severely impact plant manufacturing and production schedules.

Mass customization is one of many terms to describe the process of building many variations of the same vehicle brand, such as a Honda™ Civic™, on the same assembly line, having the same platform or basic vehicle chassis. Moreover, other separate vehicle brands, such as the Acura™ 1.6EL™, which may share the same platform as another vehicle but require significantly different build sheets and instructions, may also be manufactured on the same assembly as the Honda™ Civic™ in order to reduce manufacturing costs. As a result of mass customization, it is not uncommon for a single platform to spawn thousands of variations amongst a number of different vehicle brands. These variations require a corresponding number of different parts to be made available to the assembly line in order to fulfil the build sheet instructions. It should be noted that the term "parts" is used very generically to include any type of component that may be affixed, applied or otherwise impact the particular vehicle manufactured. A "part" may include, for example, the fluids, the paint type, the paint colour, the wheel size, the exhaust system, the engine size and configuration, the transmission, the number of doors, the seat selection(s), etc.

To accommodate JIT and mass customization simultaneously typically requires a large number parts to made available at a single workstation, such as for example, the sound system (radio) installation station. However, due to physical limitations in line side space, many methods of manufacturing have been attempted to limit the number of parts changeovers. That is, a parts changeover is the removal from line side of one set of parts, such as economy sound system, with a replacement, at line side, of another set of parts, such as an upgraded or luxury sound system. To limit the number of changeovers, similar vehicle brands with similar configurations are, conventionally scheduled to be manufactured in lots or groups. That is, a production schedule is developed and implemented to group together those vehicles that have a similar vehicle brand and are configured or "optioned" by the customers in a similar fashion. In this manner, the number of different parts at line side required to manufacture the vehicles of a particular lot are significantly reduced. Nevertheless, the parts at line side, whenever there is a changeover from one lot to another, must be changed to accommodate the build instructions for the next lot of vehicles. For example, when a particular station completes its operations on the last vehicle of a first lot and is about to commence performing operations on the first vehicle of second lot, the line side parts located proximate to this station typically must be changed to accommodate the vehicle lot changeover.

Difficulties with the above described assembly line and method and often are encountered when a vehicle fails an inspection test and must be repaired or whenever part shortages or build changes must be implemented. As is well known in the art, partially completed vehicles, or vehicle assemblies, typically are inspected at one or more points during manufacture to identify defects. As a result of these inspections, a vehicle assembly failing inspection will, typically, be removed from the assembly line and the defect repaired. The repaired vehicle will then be re-inserted into the vehicle assembly line. As a result of the various inspections, removals from the assembly line, repairs and re-insertions, members of the lots of vehicles typically get "jumbled". That is, a repaired vehicle may be inserted into an available position on an assembly line in the middle of a different lot of vehicles with vastly different build instructions from that of the repaired vehicle. Consequently, parts must be made available line side at the remaining workstations (that is, those workstations downstream of the insertion point) in order for the assembly of the repaired vehicle to be completed in accordance with the repaired vehicle's build instructions. This often results in the assembly line slowing down or stopping so that the parts control systems may provide the proper parts and components to the various workstations encountering this repaired vehicle. Moreover, some parts, such as paint colors and types, may require a significant delay due to any required flushing and cleaning of the paint system from the previous paint colour and type. For instance, if a repaired vehicle, which is to be painted white, is inserted into a lot of vehicles to be painted red, the paint system (paint lines, booths, nozzles, etc.) must be purged, flushed and cleaned of any residual red paint prior to the painting of the repaired, and to be white, vehicle. This cleansing process may be quite time consuming Another difficulty encountered in the conventional assembly lines results from parts shortages. Should there be any difficulties in the JIT delivery system (which may, as aforementioned, result from the delay of as little as a single shipment of parts), the ability to perform a particular build instruction may be severely impacted. This may result in line stoppages or the removal of vehicles from the assembly line until parts are conveyed to the plant and, ultimately, line side.

Another further difficulty encountered in the conventional assembly line results from a required build instruction change. For instance, if production targets for a particular type of vehicle are not being satisfied it may be desirable to alter the order of the lots of vehicles on the production line. If the production targets are not being satisfied, an alternative action would be alter the build instructions of particular vehicles where possible.

A still further difficulty encountered with conventional assembly lines occurs when a particular part or component has been replaced (due to shortages, supplier replacement, change in vehicle or part specifications, etc.). In this instance, the build instructions of vehicles on the assembly may have to be altered. However, with conventional assembly lines and the paper based build instructions, this process is timely and prone to errors.

Accordingly, an assembly system which addresses these shortcomings is desirable.

SUMMARY OF THE INVENTION

According to one aspect of the invention, there is provided A method of manufacturing a plurality of assemblies, said method comprising: forming lots of assemblies from said plurality of assemblies; moving said lots of assemblies from a first location to a second location; tracking the position of each assembly of a first lot of said lots as each assembly moves between said first and second locations; determining that an assembly of said first lot is separated assembly of said first lot, which is an assembly separated from another assembly from said first lot; routing at least one of said plurality of assemblies along an alternate path so that said separated assembly re-unites with another assembly of said first lot.

According to another aspect of the invention, there is provided a method of routing an assembly through a manufacturing process between a first location and a second location, said method comprising: (a) determining a manufacturing priority of said assembly; (b) determining a routing path based on said determination of said manufacturing priority; and (c) routing said assembly according to said routing path.

According to another aspect of the invention, there is provided an assembly line comprising: a plurality of conveyors to move assemblies from a first point to a second point; a plurality of switching points interconnecting said plurality conveyors to form a plurality of paths from said first point to said second point; a controller for controlling said plurality of switching points and said plurality of conveyors to transfer a first assembly from said first point to said second point along a path which bypasses a second assembly positioned between said first and second points.

According to another aspect of the invention, there is provided an assembly line comprising: a first station, having a first assembly that is a member of a first group of assemblies positioned proximate to said first station; a second station, downstream of said first station, having a second assembly that is a member of a second group of assemblies positioned proximate to said second station; a third station, downstream of said first and second stations, having a third assembly that is a member of said first group of assemblies positioned proximate to said third station; and a router adapted to transfer said first assembly from said first station to said third station bypassing said second assembly and said second station.

According to another aspect of the invention, there is provided a method of manufacturing an assembly on a manufacturing line, said method comprising: determining a level of manufacturing priority of a first assembly, which precedes a second assembly on said manufacturing line; determining a level of manufacturing priority of said second assembly; if said manufacturing priority of said second assembly is higher than said manufacturing priority of said first assembly, re-ordering said first and second assemblies so that said second assembly precedes said first assembly on said manufacturing line.

According to another aspect of the invention, there is provided a system for routing an assembly through an assembly process comprising a plurality of assembly lanes, said system comprising: a receiver for receiving signals from an assembly identifier, said signals comprising an assembly identifier unique to said assembly; said receiver for receiving signals indicating current position of said assembly in said assembly process; said receiver for receiving signals relating to said assembly's current manufacturing priority; a processor, responsive to an output of said receiver, for determining a current route for said assembly; and a transmitter, responsive to an output of said processor, for transmitting signals indicating said route to said plurality of assembly lanes.

According to another aspect of the invention, there is provided computer software media, which, when loaded into a processor, adapts said processor to: receive signals from an assembly identifier, said signals comprising an assembly identifier unique to said assembly; receive signals relating the current position of said assembly in said assembly process; receive signals relating to said assembly's current manufacturing priority; responsive to said received signals, determine a current route for said assembly; and transmit signals indicative of said current route to a plurality of assembly lanes.

According to another aspect of the invention, there is provided a method of manufacturing a first and a second assembly in an assembly process, said method comprising: tracking said first and second assemblies through said assembly process; determining said first assembly's manufacturing priority; determining said second assembly's manufacturing priority; and if said second assembly's priority is greater than said first assembly, positioning said second assembly downstream of said first assembly in said assembly process.

According to another aspect of the invention, there is provided a system for the manufacturing of a plurality of assemblies, said system comprising: a conveyor system for moving said assemblies from a first position to a second position, said conveyor system having a plurality of paths interposed between said first and second positions; a computer adapted to assign said plurality of assemblies to lots and adapted to track the position of each member of a first lot of said lots as each member moves between said first and second locations, said computer also adapted to determine when an assembly of said first lot is separated from said first lot; and said computer adapted to route at least one of said plurality of assemblies along an alternate path of said conveyor system so that an assembly that is separated from its lot can rejoin its lot to form a contiguous group with said other assemblies of said first lot.

BRIEF DESCRIPTION OF THE DRAWINGS

The present invention will be more clearly understood after reference to the following detailed specification read in conjunction with the drawings wherein.

DETAILED DESCRIPTION OF THE PREFERRED EMBODIMENT

While the preferred embodiment of the invention has been illustrated and described, it will be appreciated that various changes can be made therein without departing from the spirit and scope of the invention.

Throughout the remainder of the specification the following terms will be used. The meanings of these terms are defined below.

Figure 1A:
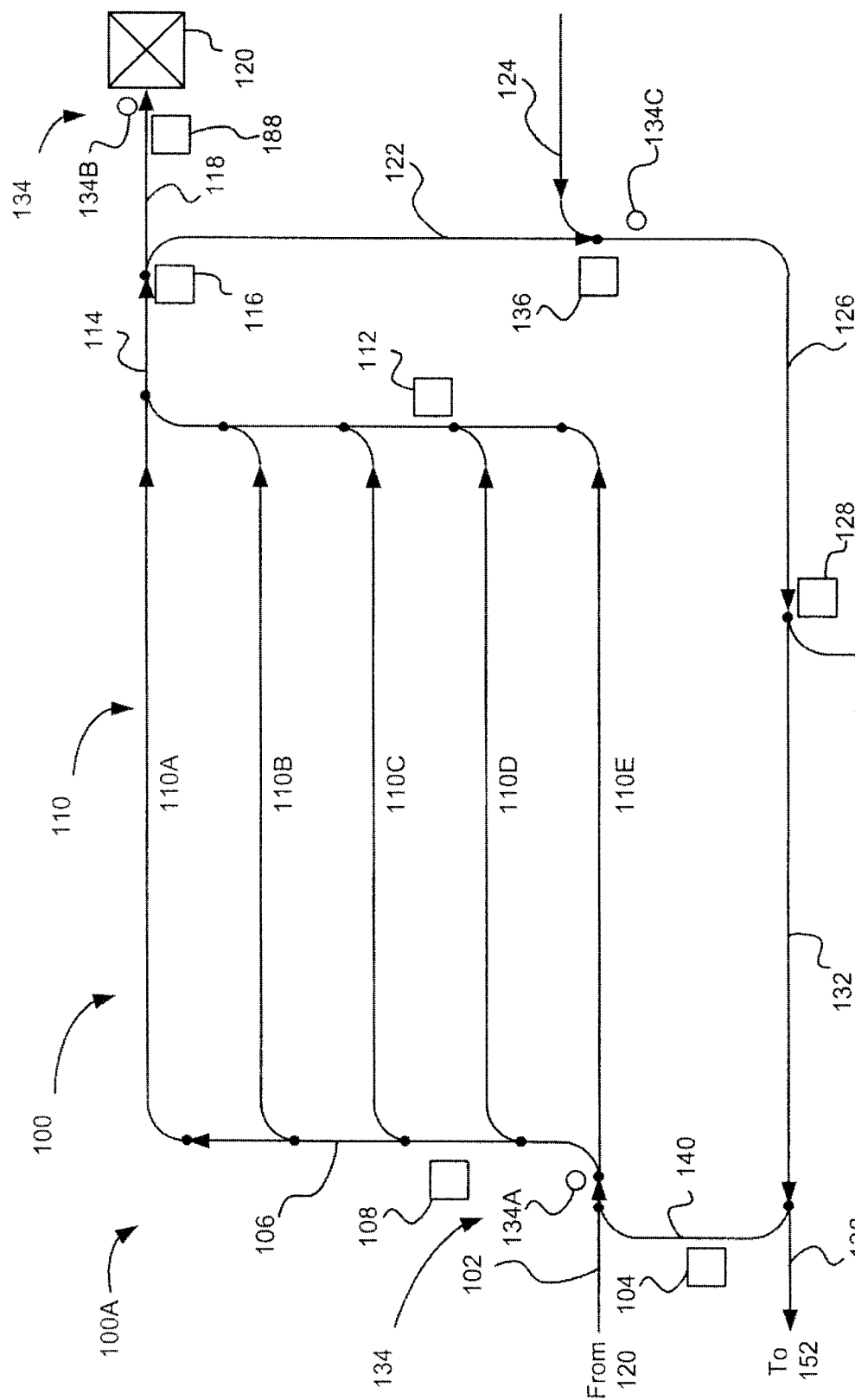
FIG. 1A is a plan view of a first level of an automobile assembly line constructed in accordance with one embodiment of the invention.

PBS Painted Body Storage—illustrated in FIG. 1A as element 100A. This term refers to an area for painted and partially completed vehicles. In the embodiment described herein, the PBS area is located on a lower level below the ABS area.

Figure 1B:
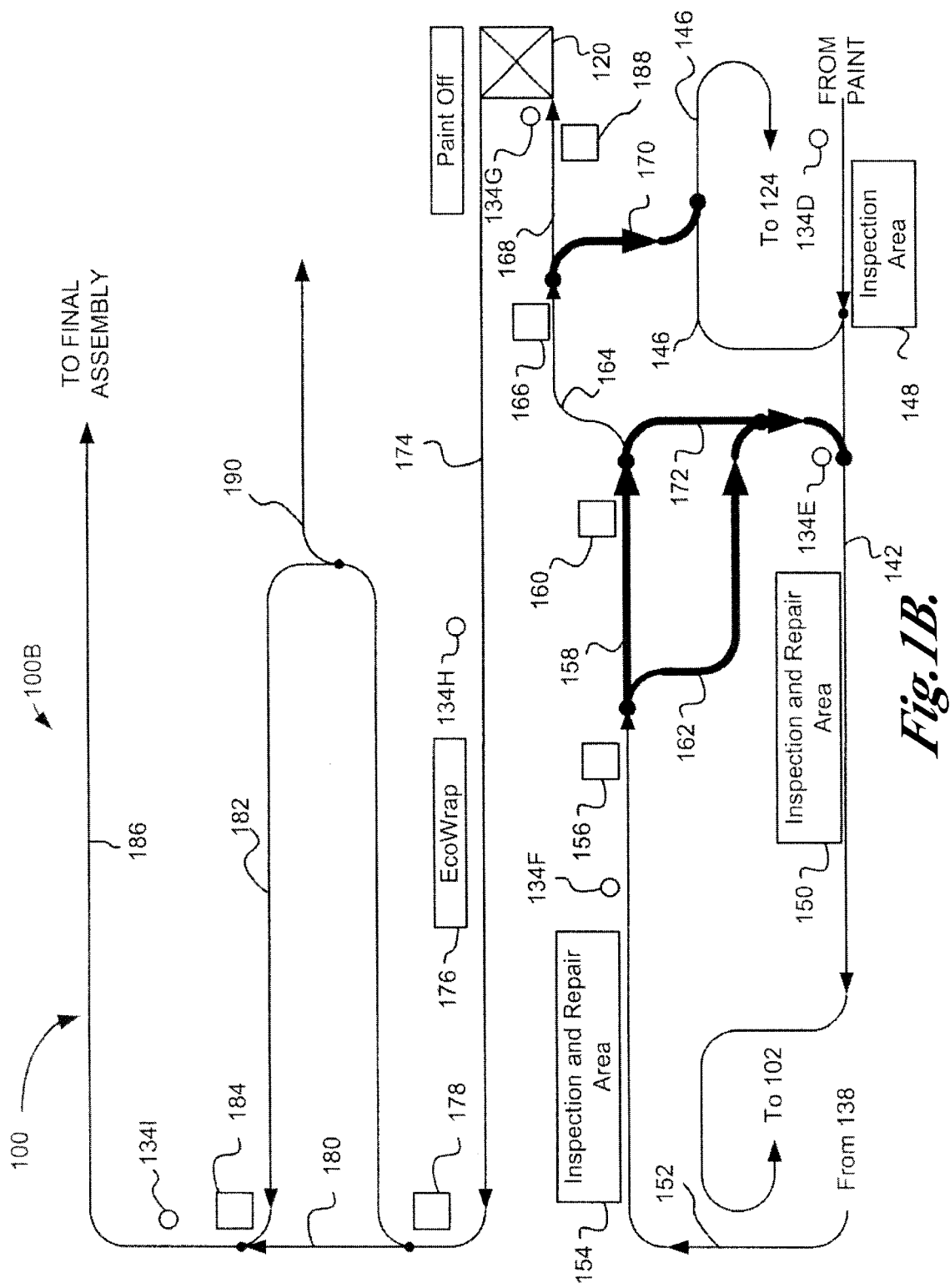
FIG. 1B is a plan view of a second level of an automobile assembly line constructed in accordance with one embodiment of the invention.
Figure 2:
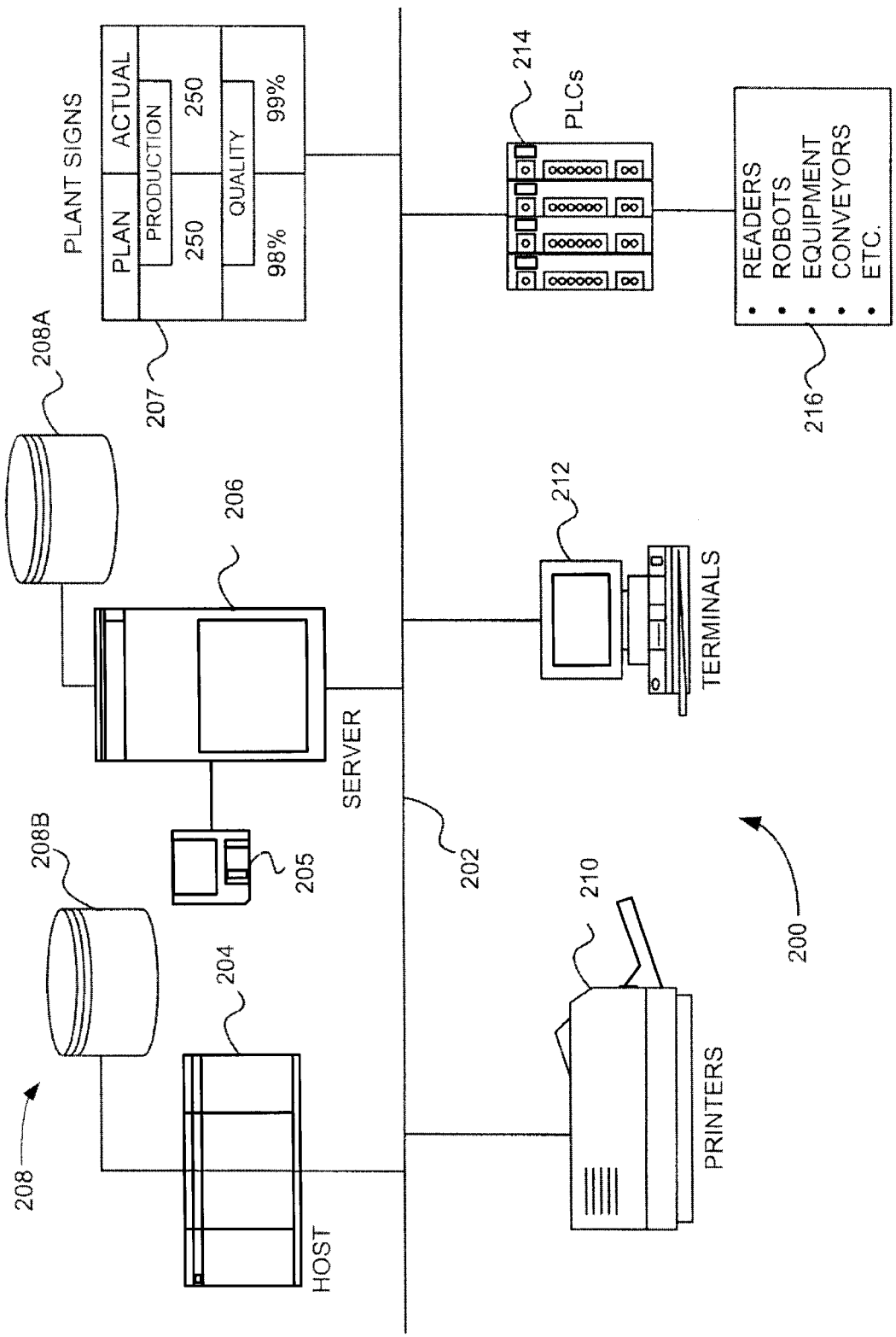
FIG. 2 is a schematic of a computer network used in conjunction with assembly line of FIGS. 1A and 1B.

ABS Assembly Body Storage—illustrated in FIG. 1B as element 100B. This ABS area, located in the herein described embodiment above the PBS area, receives partially completed vehicles from the PBS area and Final Assembly (AF) area and transfers these vehicles to the Final Assembly area and the PBS area, depending on the vehicle's status and condition PBS STATUS A vehicle has an associated PBS status indicator that is set to either PASS or FAIL. A passed PBS status indicates that a particular vehicle has satisfied various quality criteria and can then be transferred to final assembly. A failed PBS status indicates that the vehicle has a defect that must be repaired prior to Final Assembly. The PBS status indicator for a particular vehicle may be changed at any of the inspection and/or repair areas (areas 148, 150 and 154—FIG. 2). The inspection areas perform a variety of inspection tests. The failure of any one of these tests may result in a vehicle's PBS status being changed to FAIL. A vehicle that has not failed any quality inspections, or that has had all identified defects repaired, will have a PBS status set to PASS. The PBS status indicator is stored in database 208 of manufacturing network 200 (FIG. 2).

PRODUCTION STATUS Each vehicle has an associated Production Status indicator. The Production Status indicator can be set to one of SCRAP, HOLD or RELEASED. A vehicle with a Production Status of SCRAP indicates that a major defect has been identified and that the vehicle should be scrapped. A HOLD Production Status indicator represents that the vehicle should not, at least temporarily, continue through the manufacturing process. The vehicle may be stored off-line or on-line in temporary storage lanes (such as lanes 110—FIG. 1). A RELEASED Production Status indicates that the vehicle can proceed to the next stage of the manufacturing process. This productions status may be updated throughout the assembly process. The Production Status indicator is stored in database 208 of manufacturing network 200 (FIG. 2). The production status may be set, in the case of SCRAP, at any of the vehicle inspection areas. The production status of HOLD or RELEASED is determined by the manufacturing network 200 (FIG. 2), depending on the vehicle production targets, actual vehicle production statistics, the location of other vehicle's in a vehicle's lot (or group). The Production Status indicator is also stored in database 208 of manufacturing network 200 (FIG. 2).

AF Final Assembly. The AF area installs the various components onto or into the painted body such as, for example, the instrument panel, the suspension sub-assemblies, the glass, doors, engine/transmission assembly, etc.

LOT CONDITION Each vehicle is associated with, and is a member of, a lot (or group). Each vehicle has an associated Lot Condition indicator (hereinafter used interchangeably with lot condition) that can be set to DELAYED, CURRENT or FUTURE. The Lot Condition for a particular vehicle is set with respect to the position of other members of its lot and the position that the vehicle should be in if no manufacturing difficulties had been encountered. For example, a vehicle that is removed from contact with other members of its lot, due to, for example, defects being identified, will lag behind its lot. That is the vehicle will be have been DELAYED, and the vehicle's lot condition will be set accordingly. If the vehicle is positioned in the manufacturing process with other members of its lot that are undergoing the manufacturing process, the lot condition will be set to CURRENT. If a vehicle is a member of a lot that is scheduled to be processed at a later time, the vehicle's lot condition will be set to FUTURE. The Lot Condition indicator is also stored in database 208 of manufacturing network 200 (FIG. 2).

Based on a number of factors, including, for example, a vehicle's PBS status, lot condition indicator, lot number, production status, the vehicle's manufacturing priority (that is, priority of a particular vehicle, as compared to other vehicles in assembly line 10 (FIG. 1C) can be determined. Based on a vehicle's manufacturing priority a vehicle will be routed through assembly line 10.

Figure 1C:
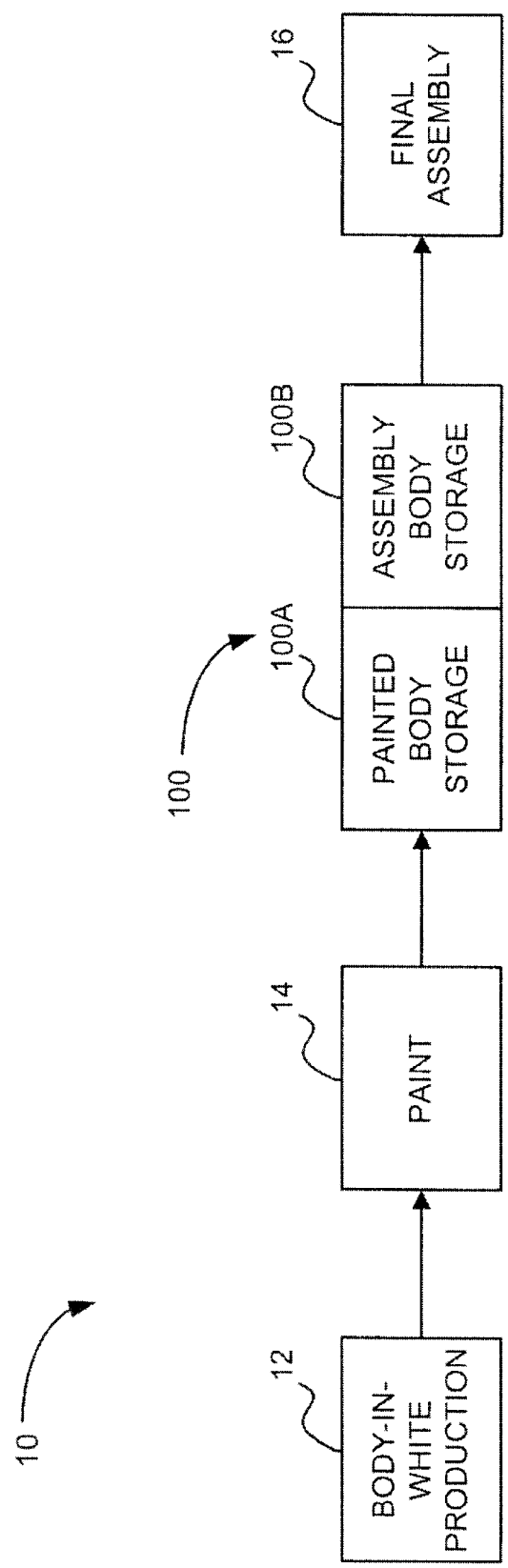
FIG. 1C is a schematic of an assembly constructed in accordance with one embodiment of the invention, incorporating the assembly lines of FIGS. 1A and 1B.

Referencing FIG. 1C, an automobile assembly line 10, embodying one aspect of the invention, is illustrated. Generally, automobile assembly line 10 comprises: body-in-white area 12, paint area 14, storage assembly line 100 and final assembly area 16. A body-in-white, that is an unpainted, unibody or body-on-frame style vehicle frame is manufactured in body-in-white production area 12. Body-in-white production area 12 feeds these bodies-in-white to paint area 14 where various coatings (such as primers, colour coats, metallic coats, clear coats, etc.) are applied to the body-in-white. These painted vehicles are then transferred to storage assembly area 100—which comprises painted body storage (PBS) area 100A (shown in FIG. 1A) and assembly body storage area 100B (shown in FIG. 1B). After being processed in storage assembly area 100, vehicles are transferred to final assembly area 16. In final assembly area 16 a variety of operations are performed including, for example, installation of the interior trim, carpeting, instrument panel, seating, drive-train, fluids, etc.

Vehicles produced on assembly line 10 have at least one unique identifier, typically the Vehicle Identification Number (VIN). Each vehicle to be manufactured, as described above, has a build sheet, which describes the processes to be performed on the vehicle and the locations of those processes, and an assembly sheet identifying the parts to be installed on or to the vehicle. This information is stored in a computer database (databases 208A, 208B of FIG. 2).

From information detailing the vehicles that need to be manufactured (based on customer orders) a production schedule is set. This production schedule may be determined by inputting into a computer (such as server 206) the customer orders. The computer may then determine the parts required to build the vehicles ordered, determine parts availability for these vehicles, order more parts (if required), etc. Based on this information stored in the computer database, a production schedule is set. This production schedule groups like vehicles (that is those vehicles that have the same similar assembly and build sheets) into groups or lots. Each of the vehicle in the production schedule will be assigned a unique identifier (such as, for example, a VIN) and a lot number. Each vehicle that is a member of the same lot of vehicles will be assigned the same lot number. This information is stored in a database (such as database 208—FIG. 2). Moreover, each vehicle has assigned three other pieces of data: a PBS status indicator; a lot condition indicator; and production status indicator, again, all stored in database 208. As described above, the PBS status indicator can be set to either PASS or FAIL. As will be described below, the PBS status may be set by inputting information into a computer terminal or by an automated inspection device, such as a robotic panel gap measuring device which is in communication with database 208. The Lot Condition Indicator can be set to DELAYED, CURRENT or FUTURE. The lot condition indicator (hereinafter "lot condition") can be set by central computer (such as server 206—FIG. 2) based on the production schedule, or based on the status of the other vehicles in the same lot. Also associated with each vehicle is a production status indicator (hereinafter "production status"). A vehicle's production status condition can be set to SCRAP, HOLD or RELEASED. As noted above, the production status indicates whether the vehicle is available to proceed to the next manufacturing process (i.e. RELEASED), the vehicle is temporarily unavailable for further production (i.e., HOLD) or the vehicle has a major defect and thus should be SCRAPPED.

Generally, FIGS. 1A and 1B illustrate a two level storage assembly area 100. Vehicles are received from the paint area 14 (FIG. 1C) by storage assembly area 100 on lane 142 (FIG. 1B). Storage area 100 provides an area for the inspection and, where possible, repair of defects on vehicles received, and the re-arrangement of vehicles prior to transfer to final assembly area 16 (FIG. 1C).

The goal of storage assembly area 100 is to transfer vehicles received from Paint area 14 (FIG. 1C) to Final Assembly area 16 (FIG. 1C) through storage assembly area 100 (FIGS. 1A, 1B, 1C) with a high pass lot rate of vehicles (that is, a high rate of vehicles with a PBS status of PASSED are to be transferred from storage area 100 to final assembly 16). Moreover, storage area 100 is designed to re-arrange the order of the vehicles prior to transfer to final assembly area 16 so that vehicles with like lot numbers are, where possible, arranged to form a contiguous group. In this way, the number of parts changeovers required in Final Assembly area 16 is reduced. However, it must be noted, that, in order to ensure that final assembly area 16 does not experience a shortage of vehicles from storage assembly area 100, it may sometimes be necessary to transfer vehicles in a particular lot to final assembly area 16 that are not contiguously arranged.

The re-arrangement of vehicles in storage assembly area 100 is achieved by having a number of different routes between two points, the ability to hold vehicles, the priority given to vehicles at various switching locations, and the overall co-ordination of these aspects. As illustrated storage assembly area 100 is comprised of a plurality of lanes. These lanes, and other lanes incorporated in automobile assembly line 10, include transport mechanisms such as, for example, conveyors (such as overhead conveyors, underbody conveyors, semi-autonomous robotic vehicle carriers, manually transferred, vehicle carriers, or the like) (hereinafter referred to generally and collectively as "conveyors") to transport the vehicles (or painted bodies) through storage area 100. Each of these conveyors may be operated independently of the other conveyors. Further, it is not necessary that these independent conveying devices, such as the conveyors, be operated at the same speed. In fact, as will be apparent below, it may be desirable to operate some conveyors at a higher speed than others. Finally, as the lanes are operated independently, it is possible to prevent vehicles from entering or leaving a lane. For example, lane 110E could be converted to a permanent storage area by allowing vehicles to enter but preventing vehicles from leaving. Similarly, if necessary, one of lanes 110 could be shut down completely if required (e.g. for maintenance purposes). Moreover, the conveyors, as will be described below, enable the tracking of the position of each vehicle (in real-time) as it moves through assembly line 10, and more particularly, in storage assembly area 100. This tracking information is stored on database 208 of manufacturing network 200 (FIG. 2). The tracking of vehicles is assisted by the identification of vehicles (and updating of the computer database) as each vehicles passes a Vehicle Identifiers (VIDs) 134. A VID 134 obtains, as a vehicle passes on the lane proximate the VID 134, the vehicle's identity and transmits this information (which may be determined, for example, by a VIN) via a communications link to database 208.

Generally, a vehicle to be manufactured is tracked from the start of the manufacturing process to the time the vehicle is delivered to its final destination. The tracking of a vehicle commences from the first process in which a component or part is manufactured for a particular vehicle. This tracking may commence during the manufacture of the body-in-white in body-in-white production area 12 (FIG. 1). In area 12, components are selected for welding of a particular portion of the body-in-white (for example, the front engine room component of the body-in-white) for a particular vehicle and its associated unique identifier (its VIN, for example). From this moment onward, the vehicle will be tracked by the movement of the vehicle by conveyors 216 (FIG. 2). Conveyors 216 will, in association with PLCs 214, communicate and update database 208 so that database 208 maintains records as to the position of the vehicle as it moves through assembly line 10. VIDs 134 act as a backup and confirmatory device. To ensure that the records maintained by database 208 regarding the position of the vehicles in assembly line 10, VIDs 134 identify vehicles as they pass proximate to the position of the VIDs, which is then transmitted to database 208 so that its records can be updated. VIDs 134 also operate to confirm the order in which vehicles are placed on the various lanes. This is of great assistance particularly where two or more lanes feed a single lane.

It should be noted that a vehicle's position in assembly line 10 can be determined directly—through the reading of a vehicle identifier, such as a SmartEye™ label, by a SmartEye™ reader, bar code reader, or other reader capable of identifying a particular vehicle (by the vehicle's VIN, for example)—or indirectly. A vehicle's position in assembly line 10 can be determined indirectly by associating the vehicle's unique identifier (such as, for example, a VIN) with a unique vehicle carrier identifier that is transferred on a conveyor, such as a conveyor, through assembly line 10. The vehicle carrier, as noted above, may be for example, an overhead carrier, underbody carrier, or the like. The vehicle's identifier and the carrier identifier with which the vehicle is associated, may change over time if, and as, the vehicle is moved from one carrier to another. This association between the unique vehicle identifier and the carrier identifier could be stored in database 208 (FIG. 2). Conveyors of assembly line 10, such as conveyors, update database 208 with information as to the position of the carriers transferred by the conveyor. This positional information of the vehicle carriers may be gathered by having a plurality of check points, such as, for example, toggle switches or bar code readers, or the like, arranged along the route of the conveyor. As a vehicle carrier passes each check point, a signal could be transmitted from the conveyor, through PLCs 214, to database 208. Based on the check point passed by a vehicle carrier, and previously stored information corresponding to previous vehicle position data acquired from previous signal received by database 208, it can be determined, based on the fact that a specific vehicle is associated with a specific vehicle carrier, the position of a vehicle on a particular conveyor. In an alternative embodiment, a conveyor could transmit to database 208 other operational information, instead of the toggle switch information, from which the position of a vehicle could be determined. For example, a conveyor, such as a conveyor, could transmit to database 208 information corresponding to the conveyor's speed of operation. Based on this information, and the time elapsed since the last update, the position of each vehicle carrier, and thus the vehicle carried, could also be determined.

The lanes of storage assembly area 100 are arranged to intersect with each other at a number of switching (or intersection) points. Based on the overall status of vehicle (which includes, for example, its PBS status, its lot condition and production status), routing instructions are generated and transmitted to the switching points so that a vehicle is transported according to a determined route. The switching points (indicated by a dot or circle on FIGS. 1A and 1B) may be, for example, a rail conveyor switch, instructions to be performed by a semi-autonomous robotic vehicle carrier, a robotic handler transferring a vehicle from one lane to another, or the like. In the described embodiment the switching points are controlled by a controller, such as computer application or sub-routine (referred to as a "processing station"), that performs operations upon an event occurring, such as a tracked vehicle arriving at a point proximate to a switching point. The controller of the switching points may be a computer application running on a computer proximate to the switching point, or as described below, it may be centralised a single machine such as, for example, server 206 (FIG. 2). A single processing station may co-ordinate the movement of vehicles by controlling several switching points. For example, processing station 108 coordinates vehicles received from lane 102 and being transferred to one of five lanes (lanes 110A, 110B, 110C, 110D and 110E). Similarly, processing station 112 controls the movement of vehicles that are being fed form lanes 110A–110E to lane 114. The controller may operate the conveyors of the lanes directly, or indirectly with the assistance of Programmable Logic Controller (PLC) or the like.

Generally, the conveyors, switching points and controller (such as processing stations described below) form a router that routes a vehicle through assembly line 10. The router determines, based on information about assembly line 10 and the vehicles thereon (such as equipment availability, vehicle manufacturing priority, availability of conveyors, production schedules, status of various production areas (such as Final Assembly, Paint and the like), routing paths for each individual vehicle and routes these vehicles accordingly.

As aforementioned, the goal of storage area 100 is to re-arrange the order of vehicles so that contiguous groups of vehicles with the same lot number are transferred to final assembly area 16 (FIG. 1C). The movement of vehicles to one of storage lanes 110 from lane 102 (controlled by processing station 108) is based on the vehicle's PBS status, lot condition and production status. Similarly, vehicles are transferred out of storage lanes 110, based on the same indicators, by processing station 112.

Generally, vehicles passed to storage assembly area 100 undergo an inspection process, the results of which are input into database 208 via a computer terminal or by a robotic or automated inspection device. If a vehicle fails inspection its PBS status indicator may be set to FAIL. As a result, this vehicle may need to be repaired. Moreover, it is possible that a single member of a vehicle lot may be the only vehicle to fail inspection. In such an instance, it is necessary for the failed vehicle to be repaired and prior to being sent to Final Assembly area 16 (FIG. 1C). Further, it is desirable to have this failed vehicle, once repaired, be re-united with the other members of its vehicle lot. This may be accomplished by, for example, expediting the failed vehicle through storage lanes 110 into inspection and repair area 154. If possible, any necessary repairs are carried out and the failed vehicle will have its PBS status changed to PASSED. The repaired vehicle can then be quickly moved, ultimately, to lane 174. Meanwhile, the other members of the repaired vehicle's lot may have been temporarily stored in storage lanes 110 or moved in the ordinary fashion to lane 118 and ultimately to lane 174. By expediting the now repaired vehicle out of lanes 110, it is possible that this vehicle has "caught up" with the other members of its lot. If the repaired vehicle is still behind, or DELAYED, compared to other members of its vehicle lot, the repaired vehicle can be again expedited through storage assembly area 100 by the use of shunt lane 180. The other members of its lot may have been directed by the conveyor controller, processing station 178, to lane 182. In this manner the repaired vehicle will have a much shorter route to lane 186 (and ultimately final assembly area 16) than the other members of its lot. The repaired vehicle can then rejoin other members of its lot at an appropriate position by having the computer activate the conveyor in lane 180 at an appropriate time. In many cases, either of these two processes (expediting a FAILED vehicle from storage lanes 110 and the use of shunt lane 180) will be sufficient to re-unite a lot of vehicles to form a contiguous group prior to final assembly area 186.

FIGS. 1A and 1B illustrate storage assembly line 100 embodying the invention. In FIG. 1A, painted body storage area 100A illustrates the lower level of a two level storage assembly line 100. FIG. 1B illustrates the upper level of storage assembly line 100—the paint inspection, repair and ABS area 100B.

Referencing FIG. 1A, partially assembled vehicles (hereinafter, the term "vehicle" will be used to include those vehicles that are partially and completely assembled), are received on lane 102 from second repair and inspection area 150 proximate lane 12—of upper level 100B (FIG. 1B). Lane 102 includes a conveyor that is communication with manufacturing network 200 (FIG. 2, described in detail below). The conveyor of lane 102 may be, for example, an overhead conveyor, an underbody vehicle conveyor, an robotic vehicle transport device that can be directed independently of other robotic transport devices, manual transports, or the like. Located proximate to lane 102 is processing station 104. Processing station 104, which interfaces with the conveyor of lane 102, either directly or via manufacturing network 200, simultaneously determines the position of vehicles on lanes 102 and 132. It should be noted that processing station 104 may only exist logically. That is processing station 104, and other processing stations described below, may not have physical locations but may exist only logically, or virtually, and may be, for example, computer applications or sub-routines running on computer server 206 or host computer 204 (FIG. 2). Moreover, if required, and if processing stations exist only logically, the computer applications could be executed on different computers. Based on the position of a vehicle (which can be determined from the position of a vehicle carrier, or the vehicle itself on a conveyor, with this data being transmitted to, and updated in, database 208) on the conveyor of lane 102 (or other lanes), manufacturing network 200 (FIG. 2), determines the path that should be taken by a vehicle that reaches the physical location demarcated by a processing station, such as processing station 104. Hereinafter, the physical locations described below and the operations of the processing stations described herein, may only be operations that are performed by the manufacturing network upon certain events occurring, such as a vehicle arriving at the physical area identified by the position of the processing stations. Based on the status of vehicles on lanes 102 and 132, processing station 104 performs operations 300 (FIG. 3—described in detail below) to move the identified vehicles from either lane 102 or lane 132 to lane 106.

Lane 106 feeds vehicles received from either lane 102 or lane 132 into storage lanes 110A through 110E (collectively storage lanes 110). Proximate to lane 106 is processing station 108 and vehicle identifier (VID) 134A. Processing station 108, through the performance of operations 400 (FIG. 4) routes the vehicles from lane 106 into lanes 110. VID 134A, which may for example, be a SmartEye™ or bar code reader, determines the identity of a particular vehicle entering an area. VID 134A may use character, bar code or SmartEye™ code recognition, or the like, for reading or scanning a Vehicle Identification Number (VIN) or other identifier which is unique to a particular vehicle. As the vehicles, which may be routed from lanes 102 or 132, past VID 134A their identity is determined and records, data and other information stored on the database 208 of server 206 are updated via communication over manufacturing network 200 (FIG. 2). The vehicles are then conveyed to one of storage lanes 10. A vehicle's position is also tracked by continuous updating of database 208 of manufacturing network 202 with positional information received from conveyors 216 through PLCs 214 (FIG. 2).

Storage lanes 110A–110E temporarily store vehicles until further processing is required or available. As will be described in more detail below, storage lanes 110A–110E are used to partially provide to the manufacturing system (which is combination of storage assembly line 100 working in conjunction with, and controlled by, manufacturing network 200) the ability to: re-arrange lots of vehicles; attempt to move an out-of-sequence vehicle which is preceded and/or followed by vehicles of a different lot, back into sequence and to be re-united with the other members of the vehicle's original and proper lot.

At the head of storage lanes 110A–110E is processing station 112. Processing station 112 determines, based on the performance of operations 500 of FIG. 5 (and in conjunction with manufacturing network 200), the order in which vehicles are removed from storage lanes 110A–110E onto lane 114.

Lane 114 bifurcates into lanes 118 and 122. Proximate to the head (i.e., the most downstream position) of lane 114 is processing station 116. Vehicles conveyed to lane 114 are passed from lane 114 to either lane 118 or loop lane 122 based on a determination made by processing station 116. Processing station 116, in conjunction with manufacturing network 200, determines based on the performance of operations 600 (FIG. 6) and the status of the vehicle entering processing station 116, the lane to which the vehicle should be conveyed.

Lane 118 terminates at conveyor shifter 120 which moves vehicles from painted body storage area 100A—the lower level of storage assembly line 100—to the ABS area 100B—the upper level of storage assembly line 100. Proximate to the lower level portion of conveyor shifter 120 is processing station 188 and VID 134B. VID 134B determines the identity of vehicles passed to conveyor shifter 120. Processing station 188, through operations 1200 (FIG. 1200), controls the flow of vehicles into conveyor shifter 120.

Loop lane 122 conveys vehicles from lane 114 to lane 126. Also feeding vehicles to lane 126 are vehicles from lane 124. Vehicles from lane 124 have passed through first vehicle repair and inspection area 148 (FIG. 1B) are received from ABS area 100B (FIG. 1B). Proximate to lane 122 is VID 134C. Using the information gathered by VID 134C, processing station 136, in conjunction with manufacturing network 200 through the performance of operations 700 (FIG. 7—described in greater detail below), controls the movement of vehicles to ensure that collisions are avoided between vehicles fed to lane 126. Moreover, the identity, location and relative position of each vehicle on lane 126 is determined, and database 208 stored on server 206 is updated as required.

Figure 8:
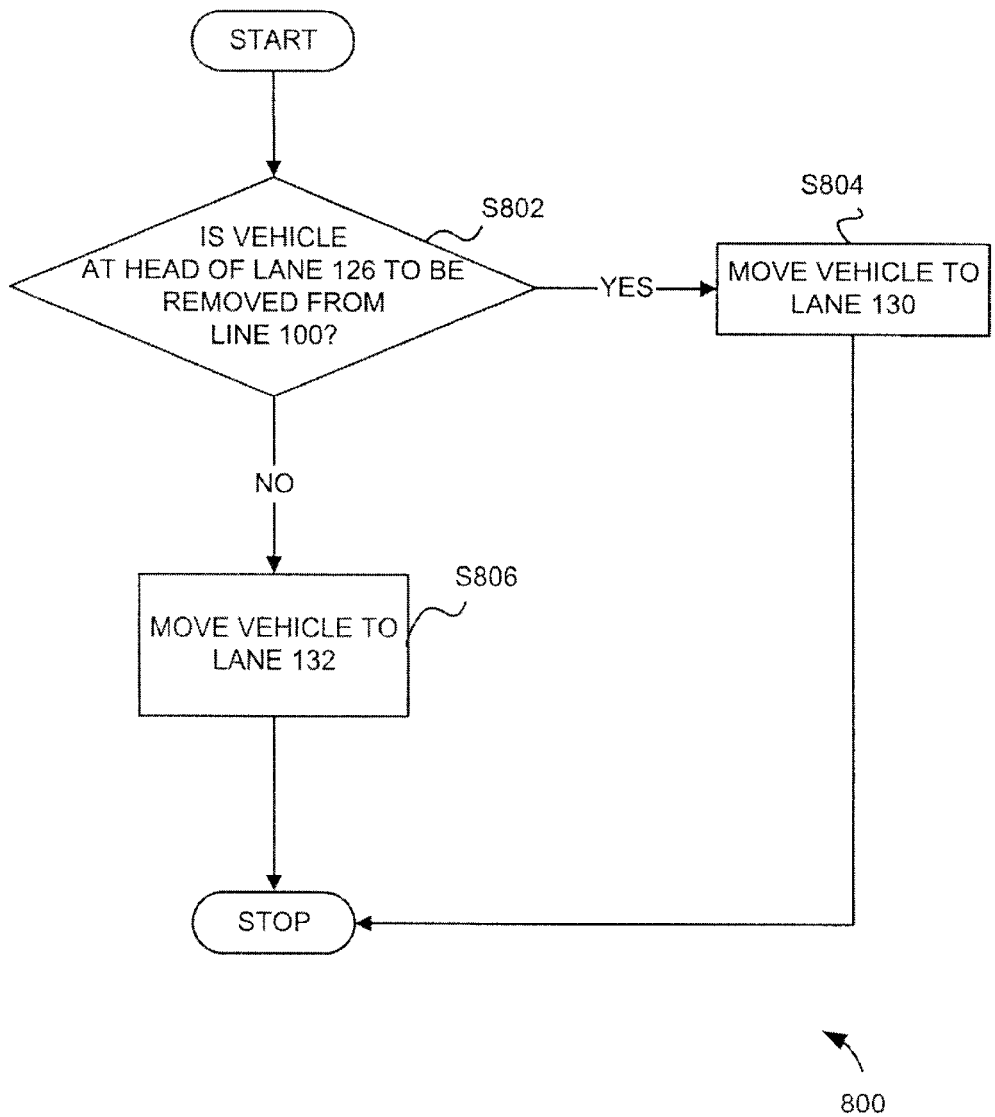

Lane 126 bifurcates at processing station 128 into spur lane 130 and lane 132. Processing station 128, in conjunction with manufacturing network 200, carries out the performance of operations 800 (FIG. 8—described in greater detail below). Spur lane 130 is used to remove vehicles, such as vehicles with a scrapped PBS status from storage assembly line 100.

Figure 3:
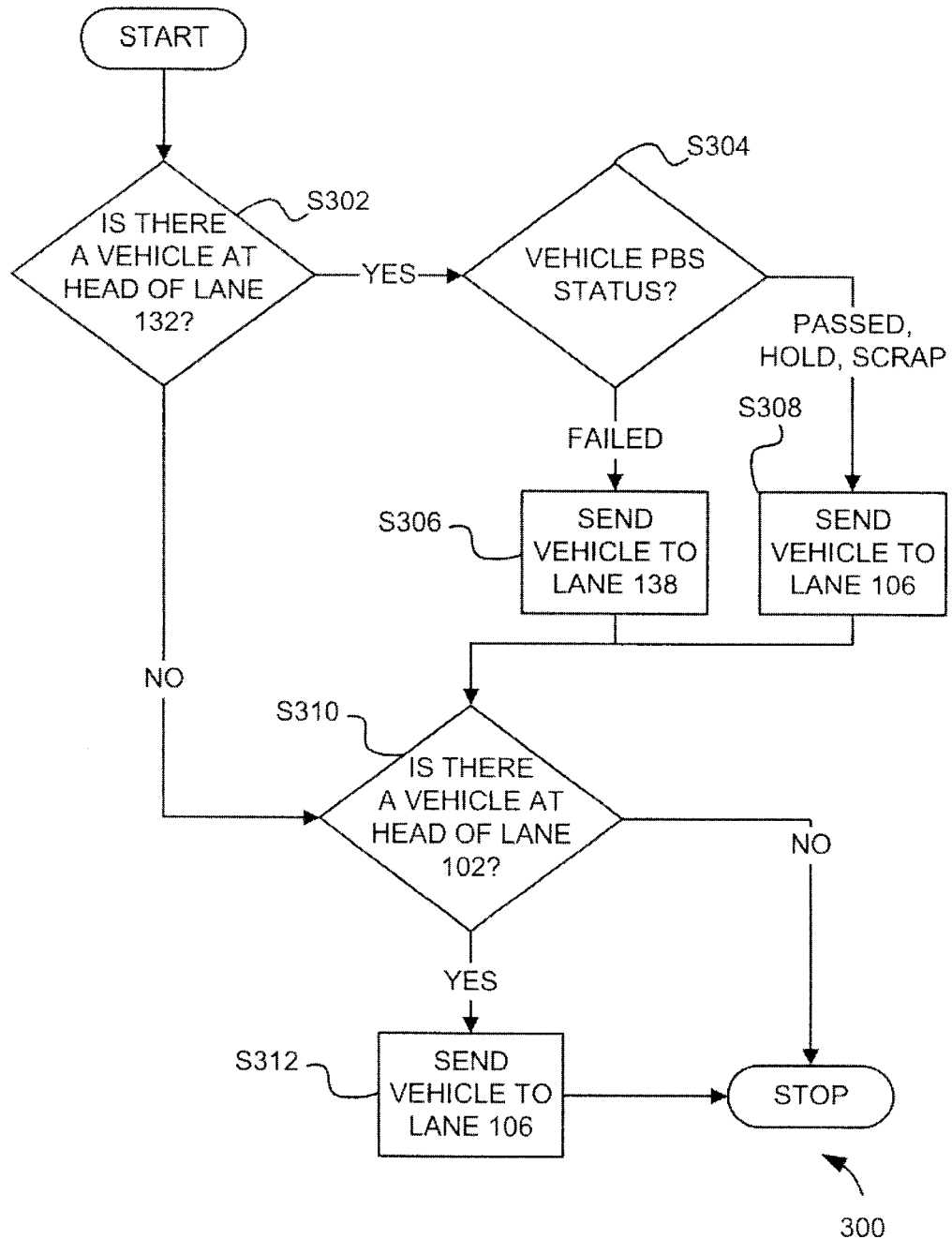
FIGS. 3–15 are flow charts illustrating operations performed on the assembly line of FIGS. 1A and 1B.

Lane 132 itself bifurcates, with one portion leading to lane 152 and the other returning to lane 102 via shunt lane 140. The path taken by a vehicle on lane 132 is determined by processing station 104 during operations 300 (FIG. 3—described in detail below).

Referencing FIG. 1B, paint inspection, repair and ABS area 100B, the upper level of storage assembly line 100, is illustrated. Vehicles transferred from the Top Coat Paint Booth (not shown) are received at the tail end lane 142. Proximate to the tail of lane 142 is VID 134D which, as previously described, operates to identify the individual vehicles as they are routed past VID 134D. Downstream of VID 134D on lane 142 is inspection and repair area 148. Inspection area 148 through operations 1500, shown in FIG. 15 and as will be more thoroughly described later, accesses the records for a vehicle entering area 148, identifies, through inspection, any defects or faults in these vehicles. The inspection, which may be carried out in-line or off-line, may be performed manually (i.e., by an associate, or through automation. This inspection information for a particular vehicle is then transmitted to and stored in the database 208 hosted by server 206. The defects identified at inspection area 148 may then be repaired at a downstream station. Downstream of inspection and repair area 148 is an intersection where lane 172 merges with lane 142. Proximate to this merging point is VID 134E. (Lane 172 as well as lanes 158, 162 and 170 are manual transfer lanes (i.e. lanes which are not automated but controlled by associates), denoted by the thicker line widths in FIG. 1B. Although, if desirable, lanes 172, 162, 158 and 170 may be automated). Further downstream of VID 134E on lane 142 is second inspection and repair area 150. As before, area 150 is designed, for each vehicle passing through, to identify any defects, transmit data corresponding to defects identified to computer server 206, access the records stored by computer server 206 for the identified defects for, the particular vehicle, perform possible repairs, and transmit information corresponding to these repairs to computer server 206 so that its records are updated. It should be noted that repair area 150, like repair area 154, may not have the capability to repair a particular defect for a particular vehicle. Vehicles leaving second inspection and repair area 150 are then ultimately conveyed to lane 102 (FIG. 1A).

Figure 10:
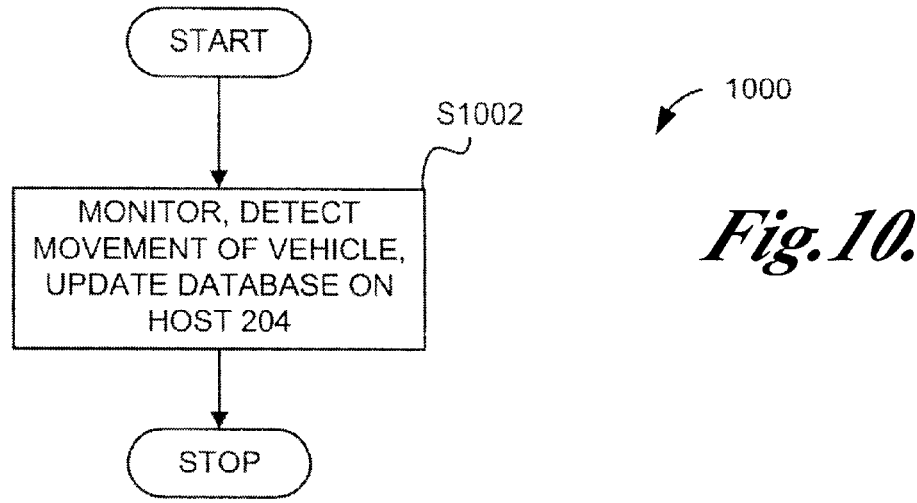
Figure 11:
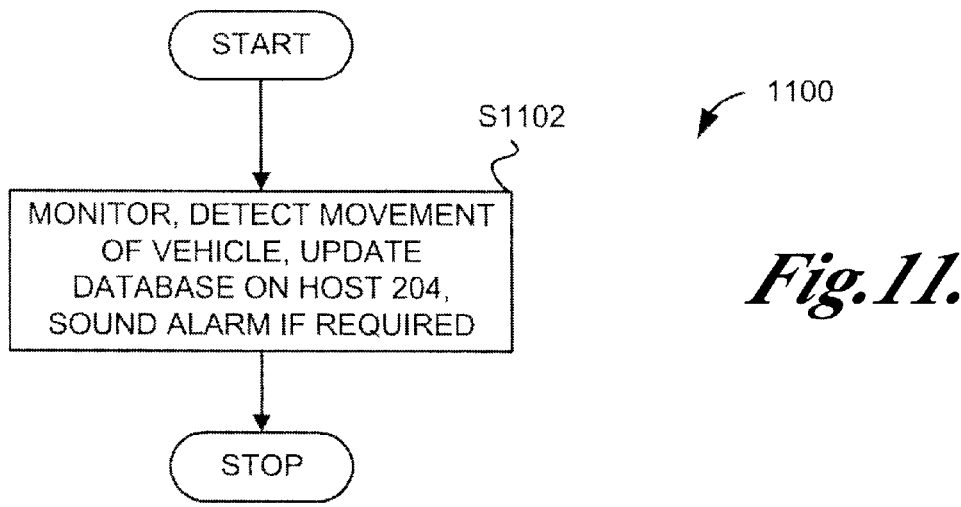
Figure 12:
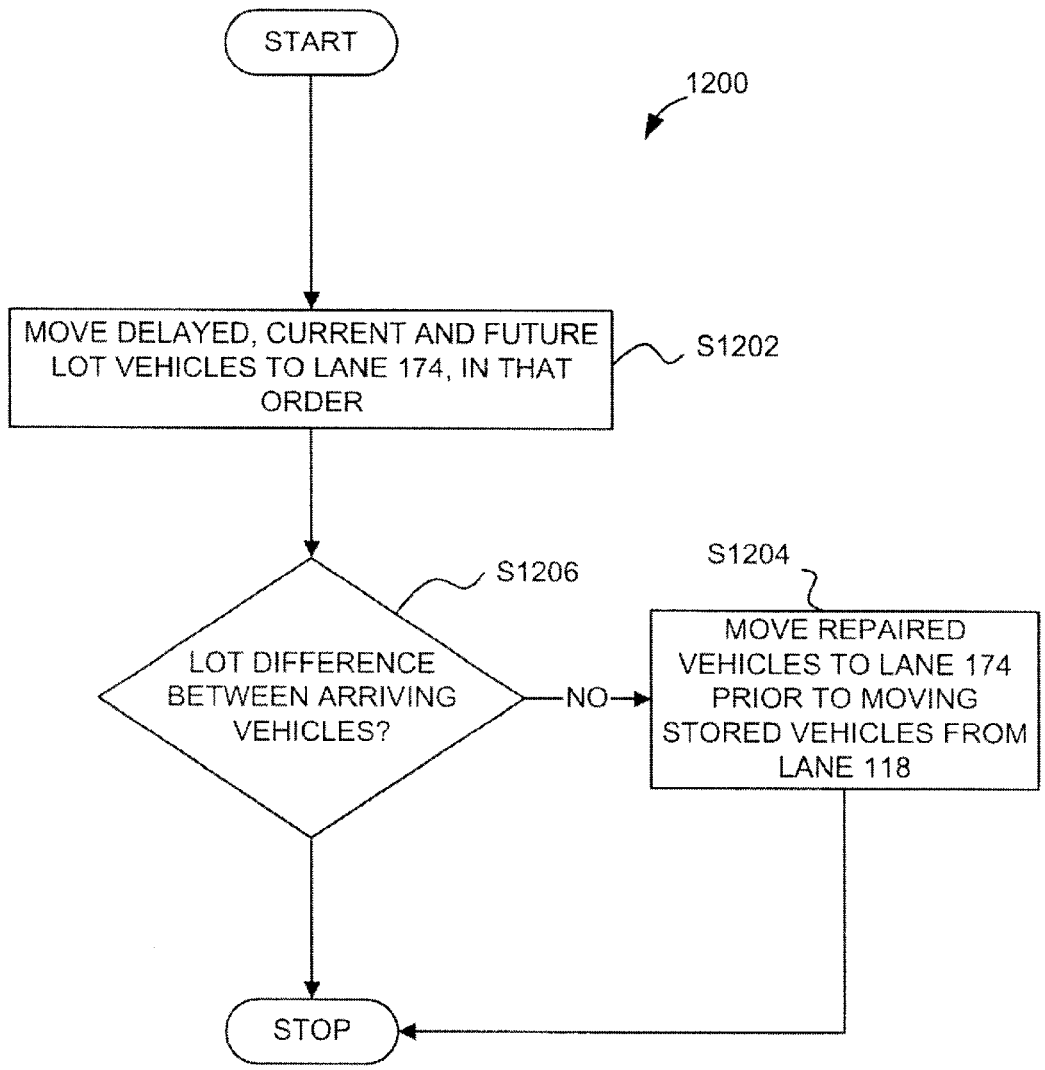

Vehicles are also received at ABS area 100B of storage assembly line 100 through the conveyance of vehicles from lane 138 (FIG. 1A) to lane 152 (FIG. 1B). Lane 152 conveys vehicles through third inspection and repair area 154 to processing station 188. Inspection and repair area 154, manually and/or through automation, further identifies any defects in received vehicles, logs the identified defects with computer server 206, performs repairs where possible (depending on the time available, nature of the defect and tools available, etc.), and records any performed repairs with computer server 206. Downstream of third inspection and repair area 154 on lane 152 is VID 134F. VID 134F identifies vehicles conveyed passed its position. Further downstream of VID 134F on lane 152 is processing station 156. Based on the status of the vehicles arriving at processing station 156 (the operations of which are described below with reference to FIG. 9), the vehicle will be conveyed to either of lane 158 or lane 162. Lane 162 ultimately feeds vehicles back to lane 142 at the merging point proximate to VID 134E of lane 142 via transfer lane 172. Vehicles conveyed to lane 158 will be conveyed to processing station 166 located proximate to the head of lane 158. Processing station 160 (the operations of which are described in detail below, with reference to FIG. 10), determines whether, based on, amongst others, the overall status and position of the vehicle, whether to transfer the vehicle to lane 172 or lane 164. Vehicles transferred to lane 172 will ultimately merge with lane 142. Vehicles transferred to lane 164 will be conveyed to processing station 166 located proximate to the head of lane 164. Processing station 166 (through the performance of operations 1100—FIG. 11) instructs the conveyors to convey an arriving vehicle to either lane 170 or lane 168. A vehicle conveyed to lane 170, which merges with lane 146, will be conveyed to lane 124 (FIG. 1A). A vehicle conveyed to lane 168 will pass to processing station 188. Processing station 188 controls (through the performance of operations 1200—FIG. 12) the movement of vehicles from Painted Body Storage area 100A (FIG. 1A), lane 168 and into ABS lane 174.

Figure 13:
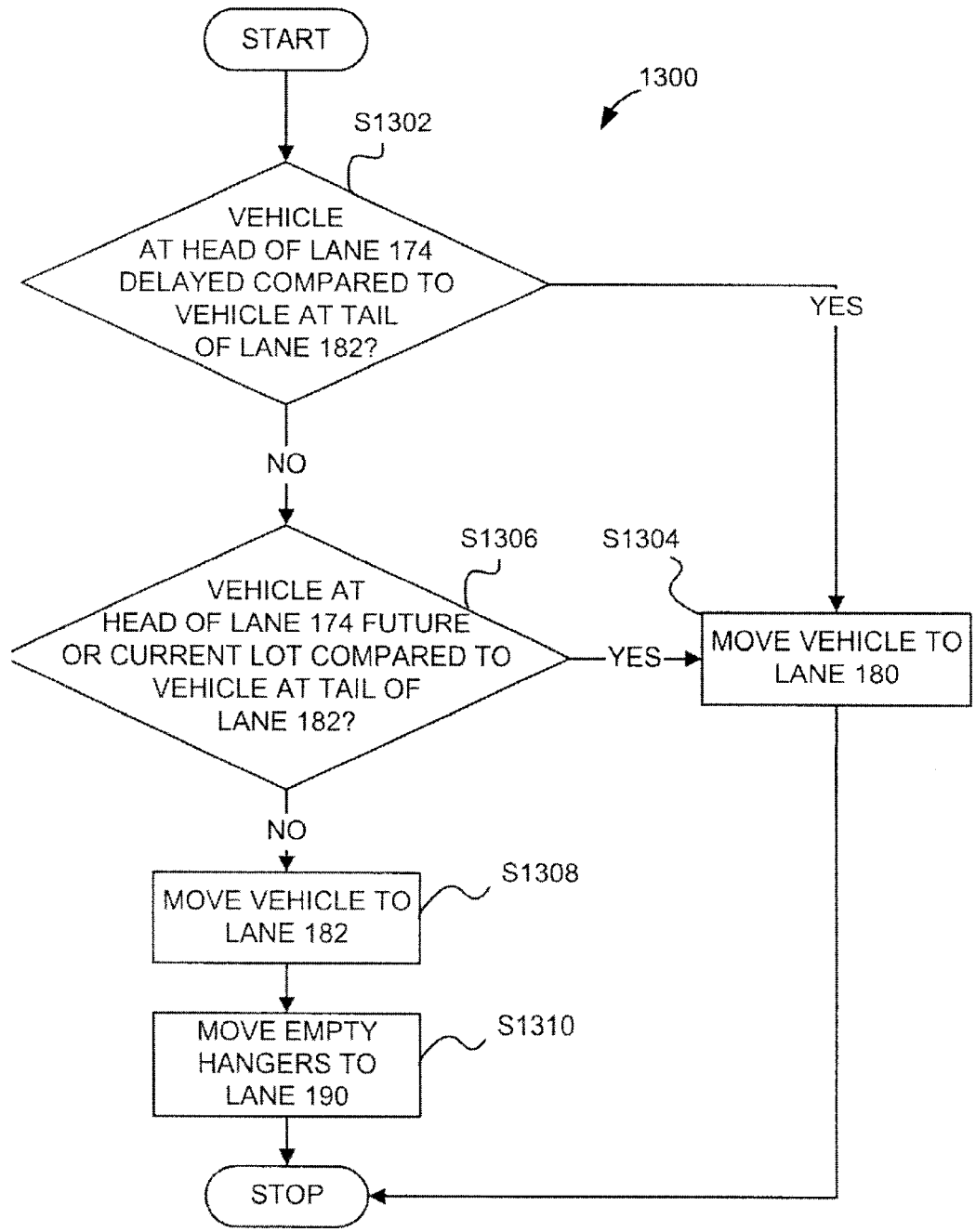
Figure 14:
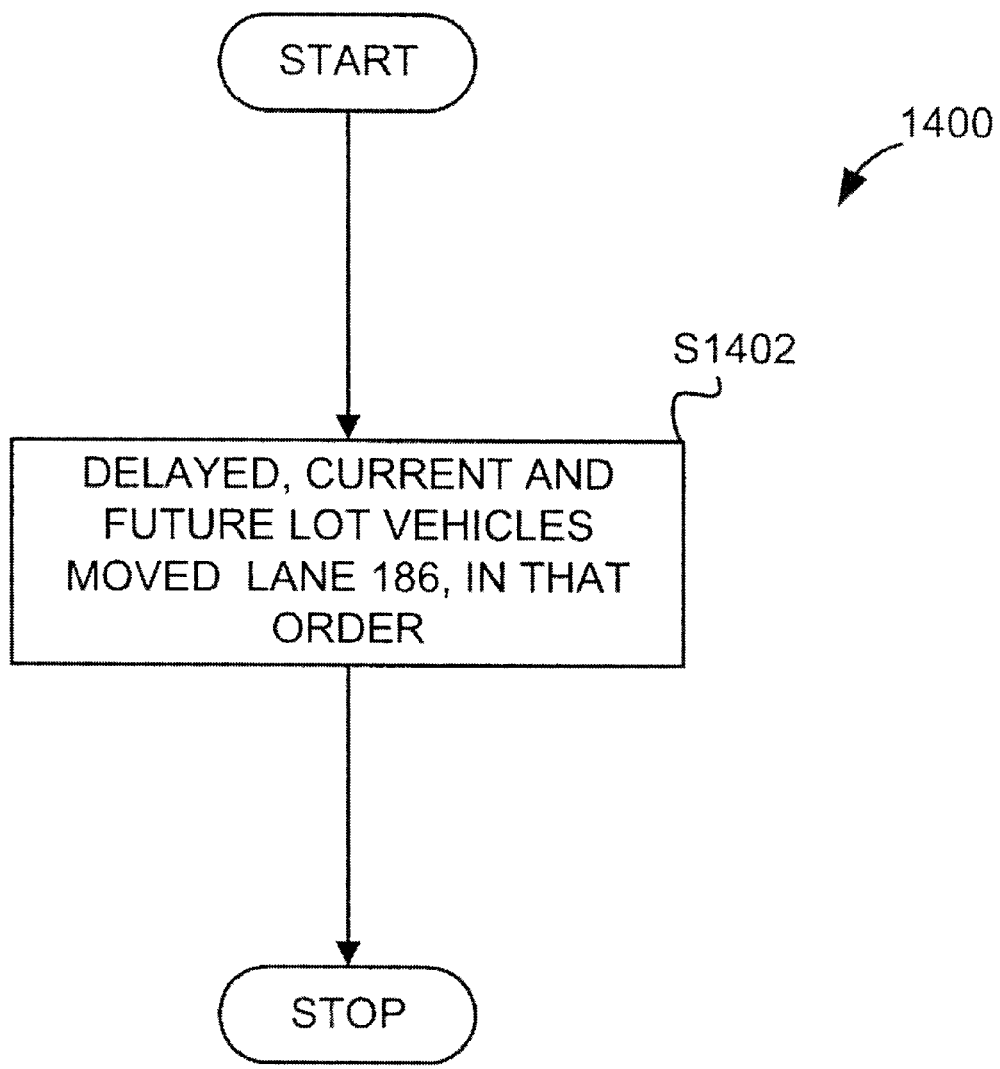

Vehicles conveyed to lane 174 will pass VID 134H, which, as described above, transmits information, including vehicle identity and location, to computer server 206 (FIG. 2). Downstream of VID 134H on lane 174 is EcoWrap™ area 176 where a protective film is applied to portions of the painted vehicle body. Upon exiting EcoWrap™ area 176, a vehicle is conveyed to processing station 178 which is located proximate to the head of lane 174 and the tail of lanes 180 and 182. Processing station 178, through the performance of operations 1300 (FIG. 13 and described below in detail) controls movements between lane 174 and lane 186. Lane 180 shunts vehicles from lane 174 to lane 186. Lane 182 is also connected between lane 174 and lane 186 but, through its circuitous routing provides temporary vehicle storage, enabling further vehicle rearrangement, and therefore lot control. Spur lane 190, which splits from lane 182, provides for the manual removal of empty vehicle carriers, if such a conveyor system is used. Proximate to the heads of lanes 180 and 182 and the tail of lane 186 is processing station 184 and VID 134I. As will be described below, processing station 184 performs operations (operations 1400, FIG. 14) to control the movement of vehicles from lanes 180 and 182 to lane 186. As will now be apparent, VID 134I, proximate to lane 184, identifies the identity and order of the vehicles conveyed on lane 186, updating the records of the database 208 on computer server 206 accordingly. Lane 186 conveys vehicles to final assembly.

Referencing FIG. 2, manufacturing network 200 is comprised of a network backbone 202, which provides for communication and may be, for instance, provided by known physical wiring technologies, such as 10BaseT, 100BaseT or the like, or wireless communications services and known networking communications standards such as, for example, Ethernet, token ring or TCP/IP networks. As illustrated, connected to network backbone 202 is host computer 204, network or computer server 206, plant signage 207, printers 210, terminals 212 and Programmable Logic Controllers (PLCs) 214. Connected to PLCs 214 is manufacturing equipment 216 which includes, but is not limited to, readers (such VIDs 134A–I, hereinafter collectively VIDs 134), robots (welding, VIN stamping, painting, sealers, surfacers, fluid fillers, engine placer, quality testing equipment, glass placement, and the like), conveyors, vehicle carriers, torque guns, computer terminals for data input and output, repair and inspection robots, and the like. PLCs 214 are typically assigned a unique address, such as IP address or the like. As a result, the addition of new pieces of equipment can be easily facilitated by inserting a new PLC 214 into network 200 and attaching the equipment to the new PLC.

Computer medium 205, which contains instructions for server 206, is readable by server 206. Computer medium 205 may contain, for example, database software, computer applications (including, for example, sub-routines corresponding to processing stations 104, 108, 112, 116, 188, 136, 128, 156, 160, 166, 178 and 184; and inspection areas 148, 150 and 154), computer data, network software, data corresponding to the layout of assembly line 10 (FIG. 1C), or the like. While computer medium 205 is illustrated as a computer diskette, it could equally be a tape, memory chip, or other removable or non-removable computer readable medium. Furthermore, the software medium may be a remote medium, such as a memory of a remote computer, and be downloaded over a suitable link such as over an network, internet, intranet, dedicated data link, or the like.

Data collected from VIDs 134, such as a SmartEye™ reader, which includes the vehicle identity (VIN) and vehicle location, is transmitted from the reader, which may be connected to a PLC 214 over network backbone 202 and stored in database 208A running on server 206. A redundant database, database 208B, is stored and housed by computer server 206. Database 208A stores data about a particular vehicle that corresponds to conventional build instruction data, as well as enhanced data corresponding to each vehicle's progress through the manufacturing process including: identified defects, PBS status, lot number, repairs performed, repairs required, physical position on storage assembly line 100 as measure over time, carrier identification upon which a vehicle is transported throughout a plant (which may change over time), identification of individual components installed on the vehicle, installation instructions performed during assembly (such as, for example, the torque settings used to install lug nuts, bolts, etc.), and the like. Virtually every part, every process and every repair and inspection detail associated with the manufacturing process and the vehicles manufactured is stored in databases 208A, 208B. In addition to the above noted data that is keyed to specific vehicles, general data corresponding to the assembly process as a whole is also stored in database 208A on host 206. This general assembly process data includes: inventory data, production schedules, tool (including robot) availability, quality results and the like. In an embodiment of the invention, database 208A is used for the collection of production data, and determines routing of vehicles throughout the manufacturing process, while database 208B is a replication of database 208B that is used for non-production inquiries (such as those made by management and suppliers about production status) and backup purposes. Using database 208A solely for manufacturing purposes assists the system's response time to database access by limiting non-production inquires and access to redundant database 208B. Database 208B may be updated every few seconds or minutes, as required. In the event that database 208A fails, production access could automatically be transferred to database 208B until such time as database 208A is operating normally. Databases 208A, 208B may be commercially available software such IBM™ Universal Database™ (UDB), Oracle™ database, or the like. Hereinafter, databases 208A and 208B will be referred to interchangeably and collectively as database 208.

PLCs 214, which may be those commercially available from suppliers such as Yaskawa™, Mitsubishi™, Allen Bradley™, and others, enable the communication between the various pieces of manufacturing equipment 216, to enable data to be transmitted from equipment 216 over network backbone 202 to server 206, and vice versa. Consequently, PLCs 214 enable two way transmission of data, including electronic instructions, to/from the equipment from/to the host computers. As a result, countermeasures to adjust the production process, such as new robotic build instructions (which may be in the form of ladder logic instructions) can be transmitted from computer server 206 to the various pieces of manufacturing equipment 216. Similarly, data on the performance of equipment 216, such as operations performed, equipment availability and the like can be transmitted from equipment 216, through PLCs 214 over network backbone 202 to computer server 206.

Terminals 212 enable real-time input and output of data from line workers (also referred to as associates), management and other interested parties. For example, data corresponding to defects identified or repairs performed by an associate relating to a specific vehicle may be input into terminals 212 by use of input device, such as keyboard, touch screen, bar code reader, or the like. This information would then be available to any other terminal or networked device (such as plant signage 207) for the display of data. The data so displayed may be summarised or collated by computer server 206 in a variety ways that are known. A network, such as network 202, does not have to be physically located on a single site. That is, network 202, although illustrated as a Local Area Network (LAN) may also be part of a Wide Area Network (WAN). In an embodiment of the invention, terminals 212 would be available: at a number of physical locations throughout the manufacturing plant; at other plants of the manufacturing; at offices of the manufacturing; at the suppliers plants and offices; and others (such as sales dealers, warehouses, etc.). These terminals 212 would be in communication with database 208 via a wide area network (which may be provided through, for example, a dedicated connection, a virtual private connection, or via a public network, such as the Public Switched Telephone Network (PSTN) or the Internet). Terminals 212 may access the data on database 208 through custom software or via commercial software such as web-browsers, such as Internet Explorer™ or Netscape™ Navigator™.

Server 206 monitors and controls manufacturing network 200. Also, as indicated previously, server 206 hosts database 208A. Server 206 may be a conventional work station, such as an IBM™ RS/6000™ running AIX™. Server 206 may also provide for data archiving and redundant capacity should there be a failure in server 206, and vice versa. If required, server 206 may be several individual computers providing the functionality described herein.

Printers 210 may be distributed throughout the manufacturing plant and may provide for the printing of: ID Cards; tracking sheets; assembly sheets for the body, frame, instrument panel, engine, knuckles, and inspections cards; and inventory print-outs, and the like.

Referencing FIGS. 1A, 2 and 3, operations 300 are performed when a vehicle reaches processing station 104, proximate to lanes 102 and 138. The determination of whether a vehicle has reached processing station 104 is determined by server 206 accessing the records of database 208, which, as previously described, receives and maintains data which tracks every vehicle's position in assembly line 10, generally, and storage assembly line 100, specifically. This positional determination is continuously performed by server 206 for operations 300 and the other operations 400–1500. Hereinafter, as operations 300–1500 are and the positional determinations (i.e., determining when vehicles are proximate to a processing station) are both performed on server 206, reference will be made to the processing stations as making this positional determination for ease of understanding. Operations 300 manage the movement of vehicles from lane 132 to the repair area 154 via lane 152 (FIG. 1B) or to lane 106 (via shunt lane 140) and from lane 102 to lane 106. Processing station 104 ensures that possible collisions between vehicles to be moved to lane 106 from both lanes 102 and 132 are avoided. Moreover, processing station 104 can enable simultaneous transfer of one vehicle from lane 132 to lane 138 and a second vehicle from lane 102 to lane 106.

If it is determined by processing station 104 that there is vehicle at the head of lane 132 (S302) that has a "failed"

PBS status (S304), then the vehicle is passed to lane 138 (S306) so that it may be repaired at repair station 154 (FIG. 1B). The determinations made by processing station 104 in steps S302, S304 are accomplished by accessing the database 208 stored in computer server 206 to determine if there is a vehicle carrier proximate to processing station 104, if so, the identify and PBS status of the vehicle it is carrying is also determined. This query is transmitted from processing station 104 (which, as described above, may only exist virtually and may be, for example, a computer application running on computer server 206 or host computer 204) to computer server 206 over network backbone 202. The response to this query, which may, for example, be based on structured query language (SQL) or other database 208 accessing instructions, is transmitted back to processing station 104. Based on the query response, processing station 104 transmits instructions to the conveyor(s) 216, again over network backbone 202, and via a PLC 214 interfacing with the conveyor(s) 216.

If processing station 104 determines that there is vehicle at the head of lane 132, and this vehicle has a "failed" PBS status, then the vehicle is transferred to lane 138 (S306). If a vehicle located at the head of lane 132 has a different PBS status (that is, PASSED), the conveyors and switches between lanes 132 and 140 and lanes 140 and 102 are instructed to transfer the vehicle from lane 132 to lane 106 via shunt lane 140 (S308). If there is not a vehicle at the head of lane 132, or there was a vehicle that was handled by steps S306 or S308, processing station 104 determines, in S310, if there is a vehicle at the head of lane 102. If there is not a vehicle at the head of lane 102, again determined based on vehicle carrier position and the status of that particular carrier (i.e., is the carrier carrying a vehicle, and if so, which vehicle), operations 300 cease until processing station 104 determines that a vehicle is at the head of lanes 132 or 102. If it is determined by processing station 104 that a vehicle is located at the head of lane 102 (S310), this vehicle is transferred, again by instructions transmitted by processing station 104, via network backbone 202, and through PLCs 214, by the conveyors 216 (and the switch between lane 102 and lane 106) to lane 106 (S312).

Figure 4:
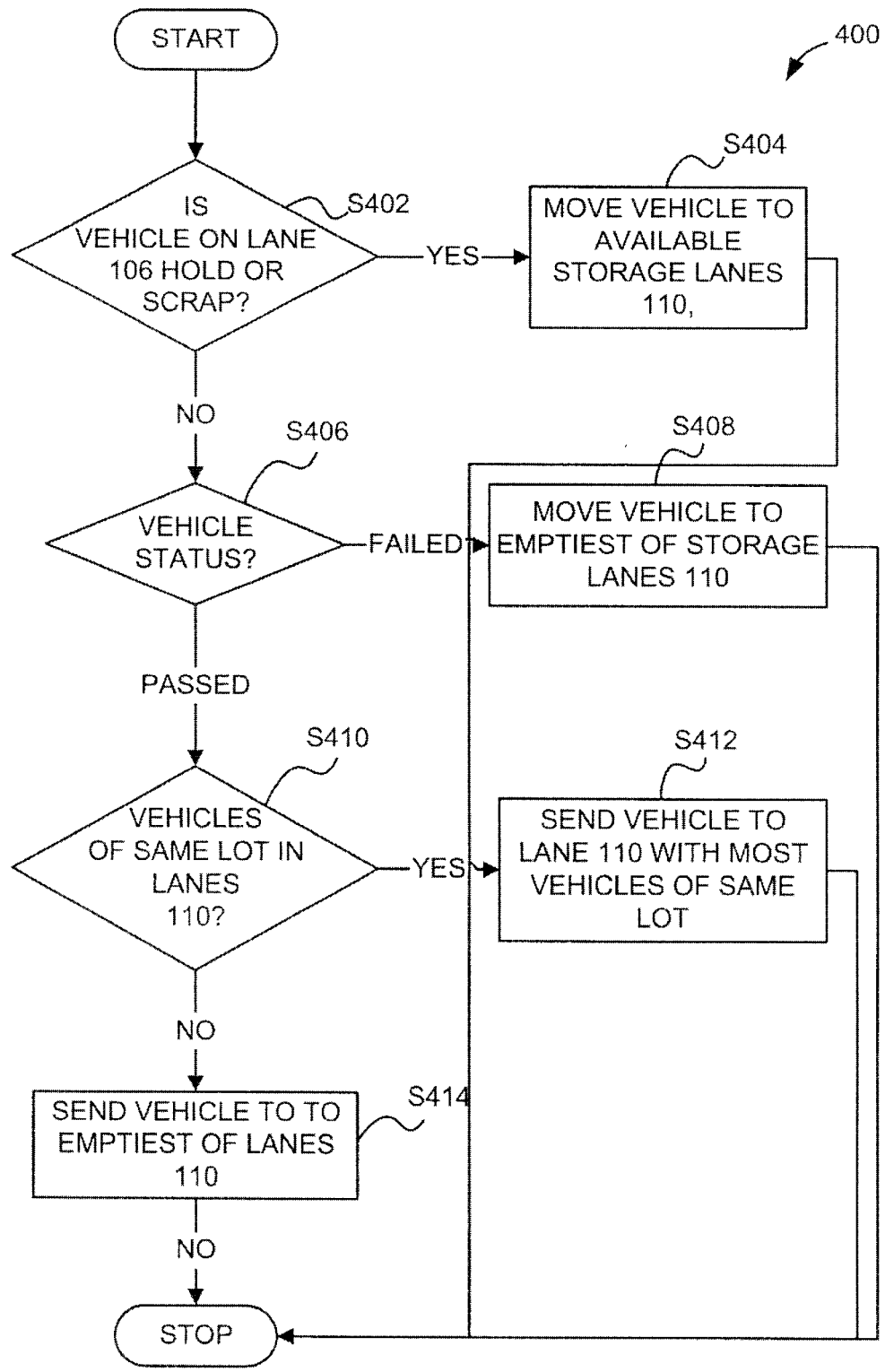

Operations 400 which are illustrated in flow chart form in FIG. 4, are performed by processing station 108 for the loading of storage lanes 110. If it is determined (in the manner described above—i.e., through interaction of the processing station, computer server 206, network backbone 202 and PLCs 214 in communication with the conveyor(s) 216) that a vehicle on lane 106 has a production status of HOLD or SCRAP (S402), the vehicle is transferred, by operation of the conveyor(s), to lane 110 with: the most HOLD or SCRAP vehicles; or the emptiest lane 110 (S404). If there is a tie (that is, there is at least one empty lane and at least one lane with a HOLD or SCRAP vehicle, or many lanes that are empty, or many lanes with the same number of HOLD or SCRAP vehicles, the priority of processing station 108 is to load the highest alphanumeric numbered lane (i.e. lane 110E prior to lane 110D). If the vehicle passed to lane 106 has a production status different from HOLD or SCRAP (S406) (i.e. RELEASED) and the vehicles has a PBS status of FAILED, then vehicle is transferred to the emptiest storage lane 110 (S408). In the event of a tie with respect to the emptiest storage lane (i.e., more than one lane of lanes 110 is empty), priority again goes to the highest alphanumeric number line. If the PBS status of the vehicle is PASSED (S406), then it is determined whether there are vehicles of the same lot in lanes 110 (S410). This determination is made by accessing the database 208 on server 206, determining the to-be-transferred vehicle's lot number, accessing the database 208 to determine if there are any vehicles in storage lanes 110, if so, determining those vehicle's lot numbers. If it is determined that there are other vehicles in storage lanes 110 with the same lot number as the to-be-transferred vehicle (S410), the vehicle is transferred to lane 110 with the highest number of vehicles with the same lot number as the to-be-transferred vehicle (S412). A tie results in the transfer of the car to the lowest alphanumeric lane available. If there are no vehicles in storage lanes 110 with the same lot number as the to-be-transferred vehicle, the vehicle is transferred to the emptiest storage lane 110. Again, in the event of more than one empty lane, the vehicle will be transferred to lowest alphanumeric lane. This latter determination (i.e., determining whether there are stored vehicles with the same lot number as the to-be-stored vehicle) can be accomplished by processing station 112, in S412, accessing database 208 to determine the lot numbers of the vehicles currently stored in storage lane 110 and comparing those lot numbers to that of the vehicle to be transferred to storage lanes 110. If there are vehicles in storage lanes 110 that have the same lot number as the vehicle in lane 106, the vehicle in lane 106 will be moved to a storage lane 110 having vehicles with the same lot number, if possible. As will now be apparent, the provision of storage lanes 110 and the performance of the above-described operations 400 enable the re-arrangement of vehicles fed to storage lanes 110 by lane 106.

Figure 5:
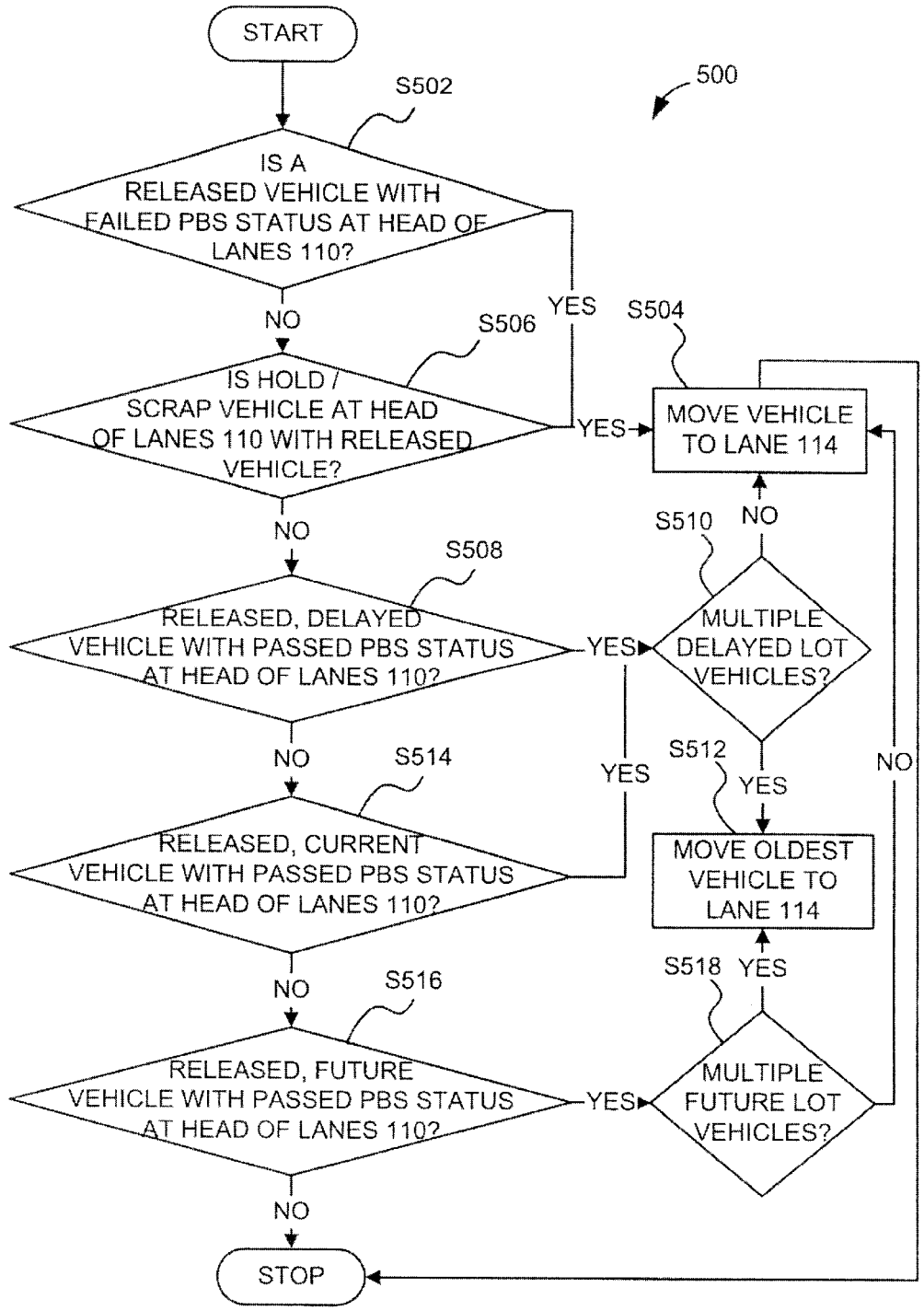

Vehicles are only temporarily stored in storage lanes 110. Simultaneous to the performance of operations illustrated in FIGS. 3–14, operations 500 (FIG. 5) are being performed by processing station 112 which is proximate to the head of storage lanes 110. Operations 500 are designed to sort the vehicles in storage lanes 110 and move these vehicles back into the various assembly processes. Operations 500 are designed to move scrap or hold vehicles at the head of one of the storage lanes which also has at least one released vehicles behind it, to be moved into lane 114 in an effort to allow the released vehicles to be, ultimately, transferred to lane 118. The hold or scrap vehicles will then automatically get shunted, or transferred, back into storage lanes 110 via lanes 122, 126, 132, 140 and 106. Further, operations 500 are designed so that vehicles, having a PASSED PBS status, are delivered to ABS area 100B (FIG. 1B) as quickly as possible while maintaining a high lot pass rate (i.e. a high number of vehicles with a PASSED PBS status being transferred to final assembly area 16 (FIG. 1C). As illustrated in FIG. 5, processing station 112 determines if there is a released vehicle (i.e., a vehicle that is neither on HOLD nor SCRAP) with a FAILED PBS status at the head of one of storage lanes 110 (S502). If there is a released vehicle at the head of one of the storage lanes 110, then the vehicle is transferred to lane 114 (S504). If there is a tie (i.e. more than one lane has a RELEASED vehicle at its head) priority goes to the lane with a vehicle with a lot condition of DELAYED and/or the lowest alphanumeric number. If there is not such a vehicle, a further determination is made by processing station 112 to determine if a non-released vehicle is at the head of one of storage lanes 110 that has at least one released vehicle in same lane (S504). If such a condition exists (non-released vehicle at head of lane 110, with a released vehicle in the same lane), the non-released vehicle is passed to lane 114 (S504). If neither of the conditions of S502, S506 are satisfied, processing station 112 determines if there is a released vehicle, which has a passed PBS status at the head of one of the storage lanes 110 (S508, S514, S516). If such a vehicle is at the head of one of storage lanes 110, then the vehicle's lot condition determines if it is transferred. For vehicles with a "passed" PBS status and having a delayed lot condition, processing station will move the oldest (that is the vehicle that is further behind the other members of its assigned lot) delayed lot condition (S510) to lane 114 (S504). In this way, the vehicles that are most out-of-synchronisation with other members of its lot, are given a priority with the desire that the vehicle be re-united with its other lot members. If no delayed, passed and released vehicles are currently at the head of a storage lane, a released and passed vehicle at the head of storage lot with a lot condition of "current", will be transferred to lane 114 (S504). Finally, any vehicles that have a PBS passed status, that are released, have a lot condition of "future" and are located at the head of a storage lane 110 (S516) will be transferred to lane 114 (S512). Priority is given to oldest of those "future" lot condition vehicles (S518) should there be multiples of such vehicles at the head of storage lanes 110.

Accordingly, operations 400 and 500 enable a vehicle with a delayed lot condition and a passed PBS status can be quickly routed in front of other vehicles with a current or future lot condition, or have a different PBS status. Consequently, storage lanes 110 enable vehicles with the same lot number to move towards the remaining processes, such as those performed during Final Assembly, more quickly than other vehicles. Therefore, storage lots 110, through the various operations performed by the various processing stations, including operations 400 by processing station 108 and operations 500 of processing station 112, may be sufficient to enable a vehicle that has been found to have a defect which has been subsequently repaired, to be reunited with the other members of its lot.

Figure 6:
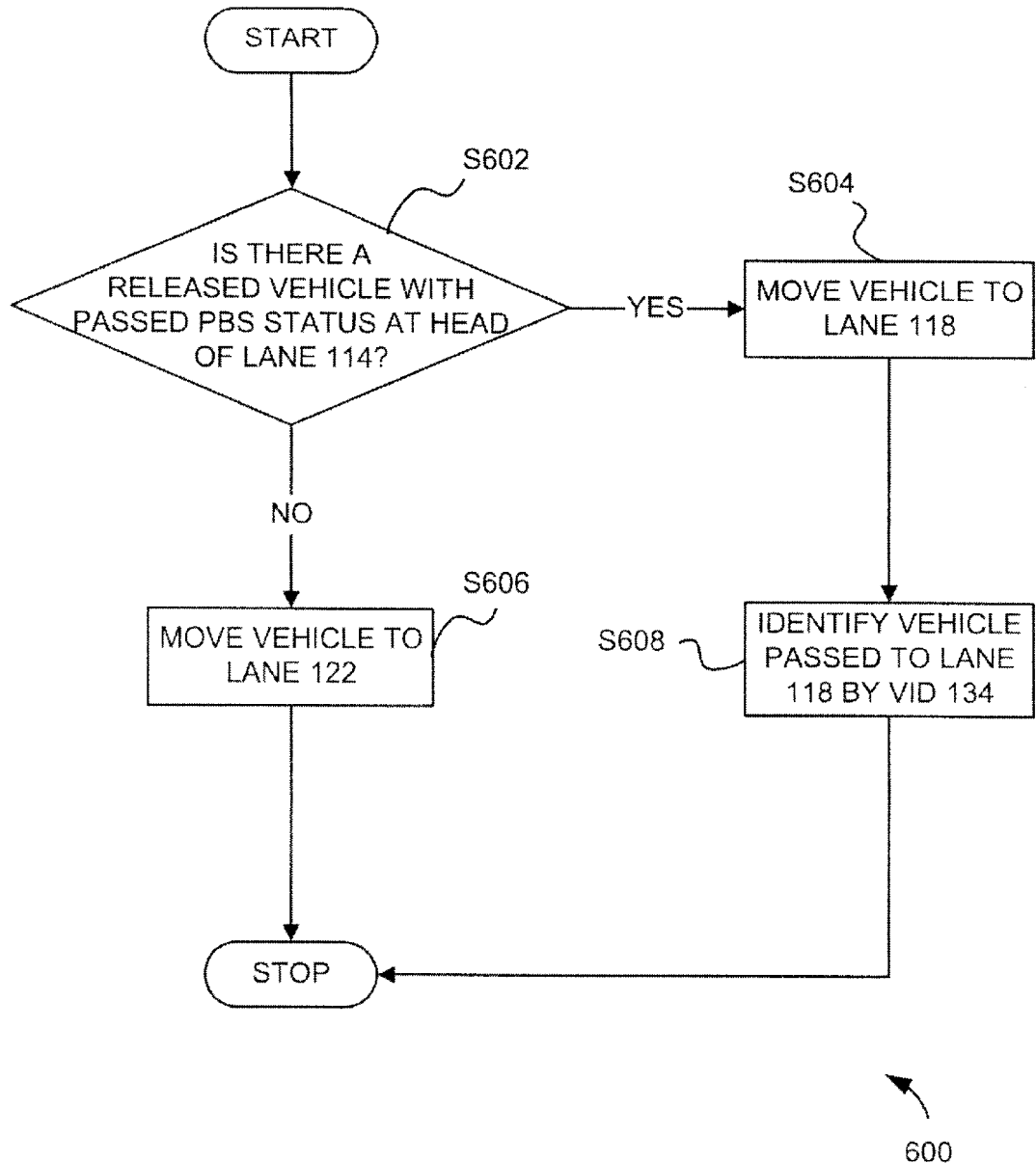

Referencing FIGS. 6, 1A and 2, operations 600 are performed by processing station 116. Operations 600 are designed to control the movement of vehicles from lane 114 to either lane 118 or lane 122. If a vehicle at the head of lane 114 (determined by communication over manufacturing network 200 between processing station 116, computer server 206, and conveyors 216 via PLCs 214 over network backbone 202) has a "passed" PBS status (S602), the vehicle will be transferred by conveyors 216 to lane 118 (S604). Vehicles passed to lane 118 will be identified by VID 134B which is proximate conveyor shifter 120. As described above, VID 134B obtains a vehicle's identity passing proximate to VID 134B and transmits this information for storage in the database 208 hosted by server 206 (S608). However, a vehicle at the head of lane 114 with a PBS status other than "passed" will be, instead, transferred to loop lane 122. Vehicles passed to loop lane 122 may ultimately be removed from the manufacturing process via spur lane 130, transferred back to storage lanes 110 (via lanes 126, 132, 140 and 106) or be transferred for repair and inspection area 154 (conveyed via lanes 126, 132, 138 and 152).

Figure 7:
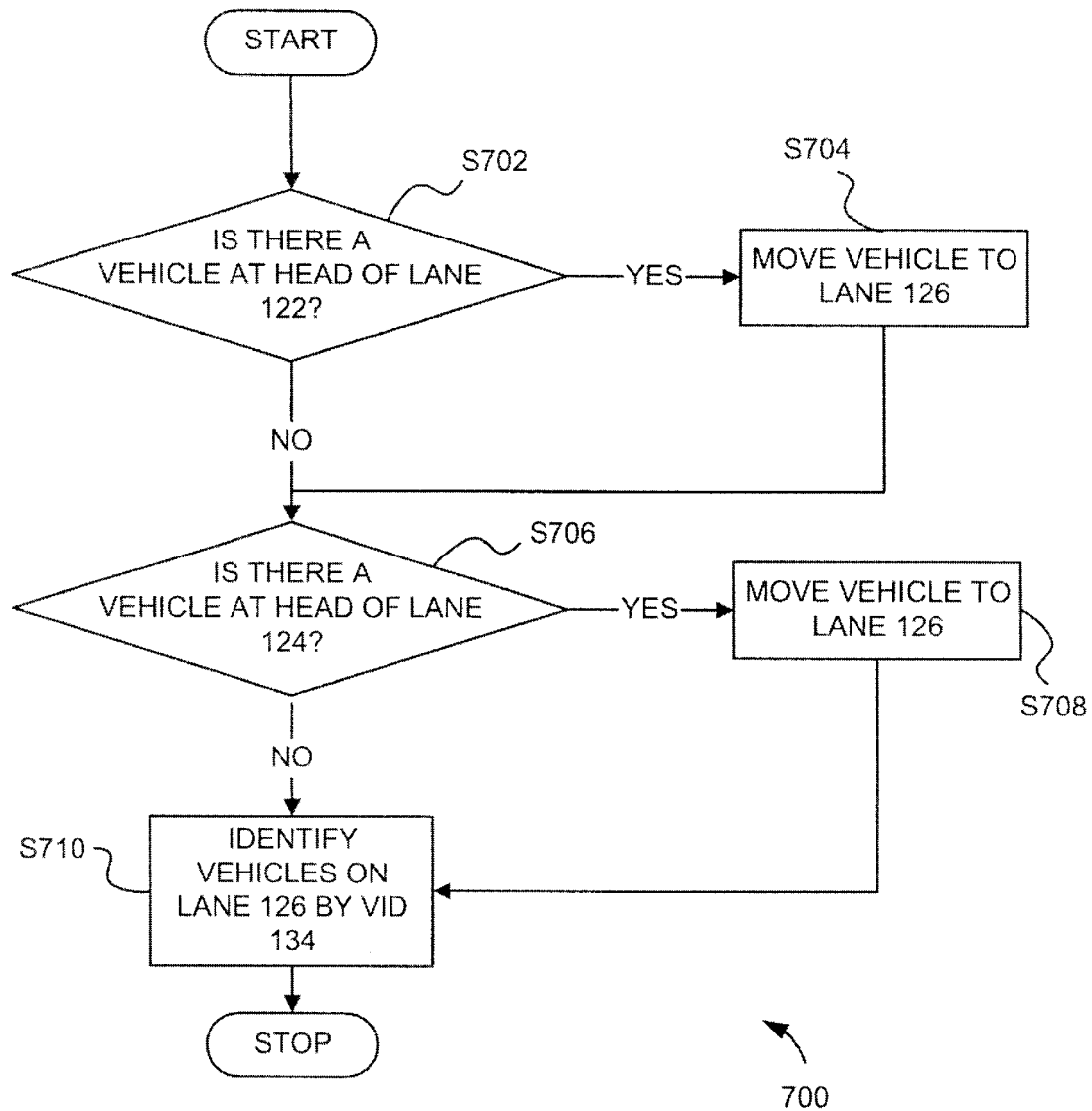

Operations 700 illustrated in FIG. 7, are performed by processing station 136, which is proximate the heads of lanes 122 and 124. Processing station 136, through the performance of operations 700 controls the movement of vehicles from loop lane 122 and lane 124 (which have been transferred from lane 146—FIG. 1B). If it is determined that a vehicle is at the head of lane 122 (S702), then that vehicle is moved to lane 126 (S704). If it is then determined that there is a vehicle at the head of lane 124 (S706), then this vehicle is also conveyed to lane 126 (S708) in a manner like that described above (through communication between processing station 136, PLCs 214 and conveyors 216 over manufacturing network 200). By performing operations S702 and S706 serially, possible collisions between vehicles from lanes 122 and 124 are avoided. Vehicles conveyed to lane 126 pass by VID 134C which transmits data to host 202 including the vehicle's identities, position, etc. (S710).

Operations 800, illustrated in FIG. 8, are performed by processing station 128 located at the head of lane 126 and prior to spur lane 130. If a vehicle or vehicle carrier proximate processing station 128 needs to be removed from the manufacturing system (S802), as determined by processing station 128, the vehicle is transferred to spur lane 130 (S804). Otherwise, the vehicle is automatically transferred to lane 132 (S806).

As described above, vehicles from Top Coat Paint Booth are transferred to lane 142. These vehicles are identified by VID 134D proximate to lane 142 and are tracked in the usual manner. Vehicles entering lane 142 pass through inspection area 148. In inspection area 148, as described above, the vehicle is inspected (either manually and/or through automation) for defects and the vehicle's PBS status will be set accordingly. If the vehicle has failed inspection at inspection area 148 and is either a current or future lot vehicle, the vehicle is transferred to lane 146 and ultimately to lanes 110 for temporary storage. If the vehicle fails inspection and the vehicle has a delayed lot condition status, the vehicle will be transferred to inspection and repair area 150 via lane 142 so that the vehicle can be repaired and ultimately, re-united with the other members of its lot. If all repairs identified for a particular vehicle at area 150 are effected, then the vehicle's PBS status is set to PASS. Regardless of whether all the repairs are effected at area 150, delayed lot vehicles will be passed to lane 102 via lane 142.

Figure 9:
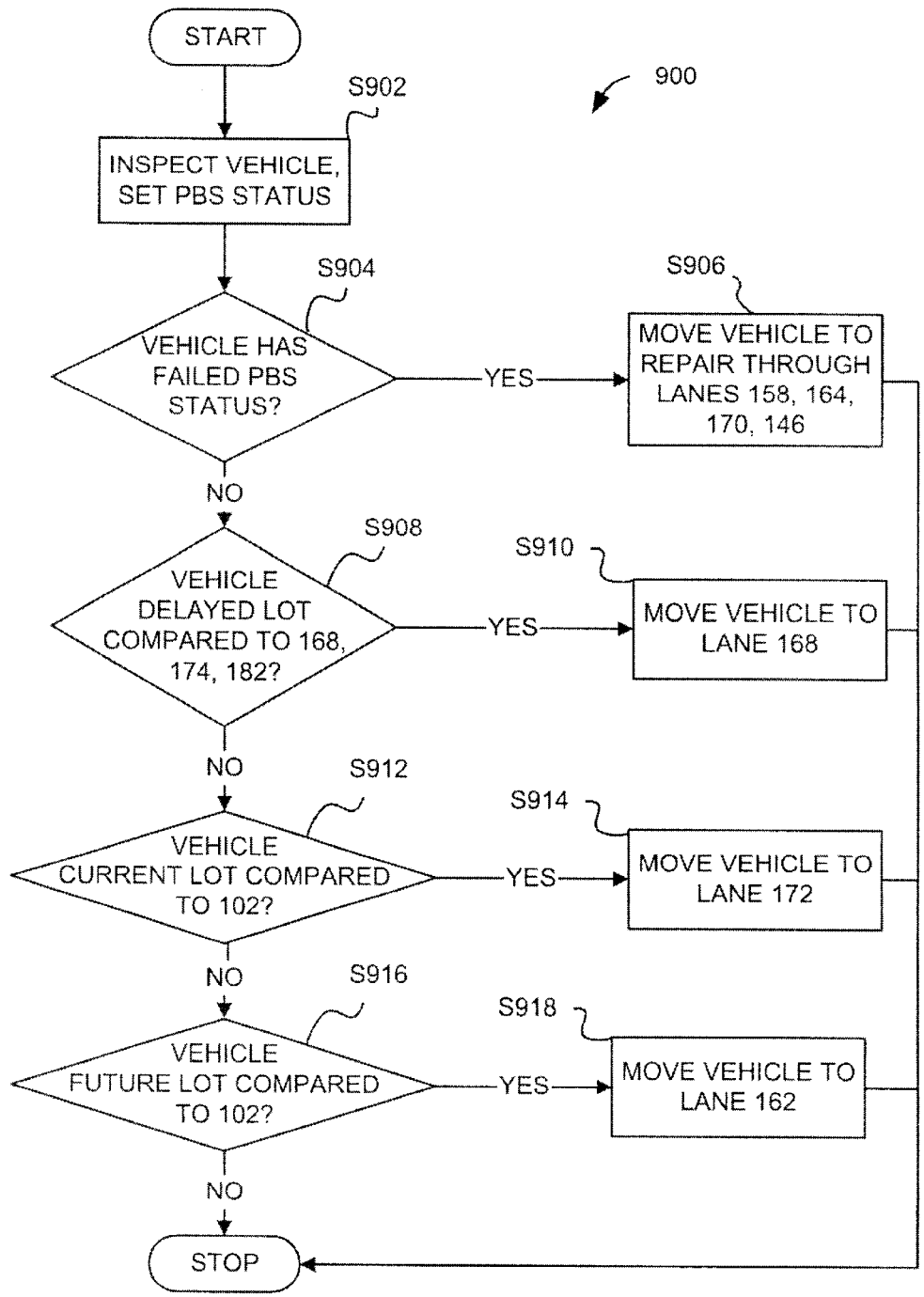

Referencing FIGS. 9 and 1B, operations 900 are performed by processing station 156 proximate to the head of lane 152. The PBS status of the vehicle inspected at third inspection and repair area 154 is set to either "pass" or "fail" either through automated inspection or through receipt of data input at a terminal 212 of manufacturing network 200 (S902). If processing station 156 the vehicle's PBS status is set to "fail" (S904), then the vehicle will ultimately be moved into a repair area via lanes 158, 162 or 172 and 146. However, should the vehicle have a "passed" PBS status, processing station 156 determines whether the vehicle proximate to this processing station has a lot which, compared to those vehicles in lanes 168, 174 and 182, is delayed (S908). If it is determined that the vehicle at processing station 156 has a comparatively delayed lot (i.e., the vehicle's is delayed more than those vehicles at lanes 168, 174 or 182), then the vehicle is prioritised by transferring the vehicle to lane 168 (S910). In this manner, and with the assistance of lanes 180 and 182, controlled by processing station 178, this delayed lot vehicle is moved more quickly through the lanes of storage assembly line 100 in attempt to re-unite this delayed vehicle with other members of its lot.

Should the vehicle at processing station 156 be a member of the current lot (S912), the vehicle is moved to lane 172 (S914). Similarly, a vehicle that is a member of a future lot (S916) will be transferred to lane 162 (S918). Vehicles with a lot condition of CURRENT or FUTURE are moved into lanes 162 or 172 so that they may ultimately be moved into storage lanes 110 allowing DELAYED vehicles (with a PBS status of PASSED) to move ahead of these vehicles prior to lane 174.

Processing station 160, proximate to the head of lane 158, performs operations 1000 and simply acts as a monitoring station detecting the movement of vehicles and updating the database 208 on host computer 204 as required (S1002).

Similarly, processing station 166, proximate to the head of lane 164, performs operations 1100 and simply acts as a monitoring station detecting the movement of vehicles and updating the database 208 on host computer 202 as required (S1102). Processing station 166 also acts as a gatekeeper by sounding a warning should an erroneous attempt be made to transfer a vehicle with a "failed" PBS status to lane 168.

Processing station 188 performs operations 1200 (FIG. 12) to control movement of vehicles from lanes 118 (FIG. 1A) and 168 (FIG. 1B) into lane 174 (which is also known as the Paint Off process area). Processing station 188 attempts to maintain a high lot pass rate. If processing station determines that the arriving vehicle from either lane 118 or lane 168 is a member of delayed, current or future lot, then one of the vehicles will be transferred to lane 174. Priority between the two lanes 118 and 168 is given to the vehicle with the comparatively older lot. That is, a lane with a vehicle that is a member of a delayed lot will have priority over a vehicle in the other lane (of lanes 118 and 168) that is a member of a current lot or a future lot. Similarly, priority is given, by processing station 188, to those vehicles that have a current lot over those with a future lot (S1202). If there is no lot difference between the vehicle arriving at processing station 188 from lane 118 compared to that arriving from lane 168 (S1204), then priority is given to the vehicle from lane 168 (S1206) in an attempt to prevent the inspection and repair areas 148, 150, 154 from becoming backlogged.

Processing station 178, proximate to the head of lane 174 and the tail of lanes 180 and 182 controls the movement of vehicles between lane 174 and shunt lane 180 or storage lane 182. The normal sequence is for current lot vehicles to be moved from lane 174 to lane 182. However, if it is determined by processing station 178 that the vehicle arriving from lane 174 is comparatively delayed compared to the vehicle at the tail of lane 182 (S1302), then the lane 174 vehicle is shunted (thereby jumping the queue of vehicles in lane 182) to shunt lane 180 (S1304). In this manner, delayed vehicles are prioritised and an attempt is made to move the vehicle downstream more quickly in an attempt to re-unite the delayed vehicle with other members of its assigned lot. If the vehicle arriving at processing station 178 from lane 174 is a future or current lot member compared to vehicle at the tail of lane 182, then the vehicle is moved via shunt lane 180 (S1304). Otherwise, and as aforementioned, other vehicles (CURRENT or FUTURE lot vehicles) are moved to storage lane 182 (S1306). Finally, processing station 178 also controls the movement of empty vehicle carriers into lane 190 (S1308).

Operations 1400, performed by processing station 184, are designed to control the movement of vehicles into lane 186 (which ultimately leads to final assembly) and thus, may be the last chance to alter the sequence of vehicles prior to final assembly. Processing station 114 moves vehicles from lanes 180 and lane 182 onto lane 186 in the order of delayed lot, current lot and then future lot (S1402).

Figure 15:
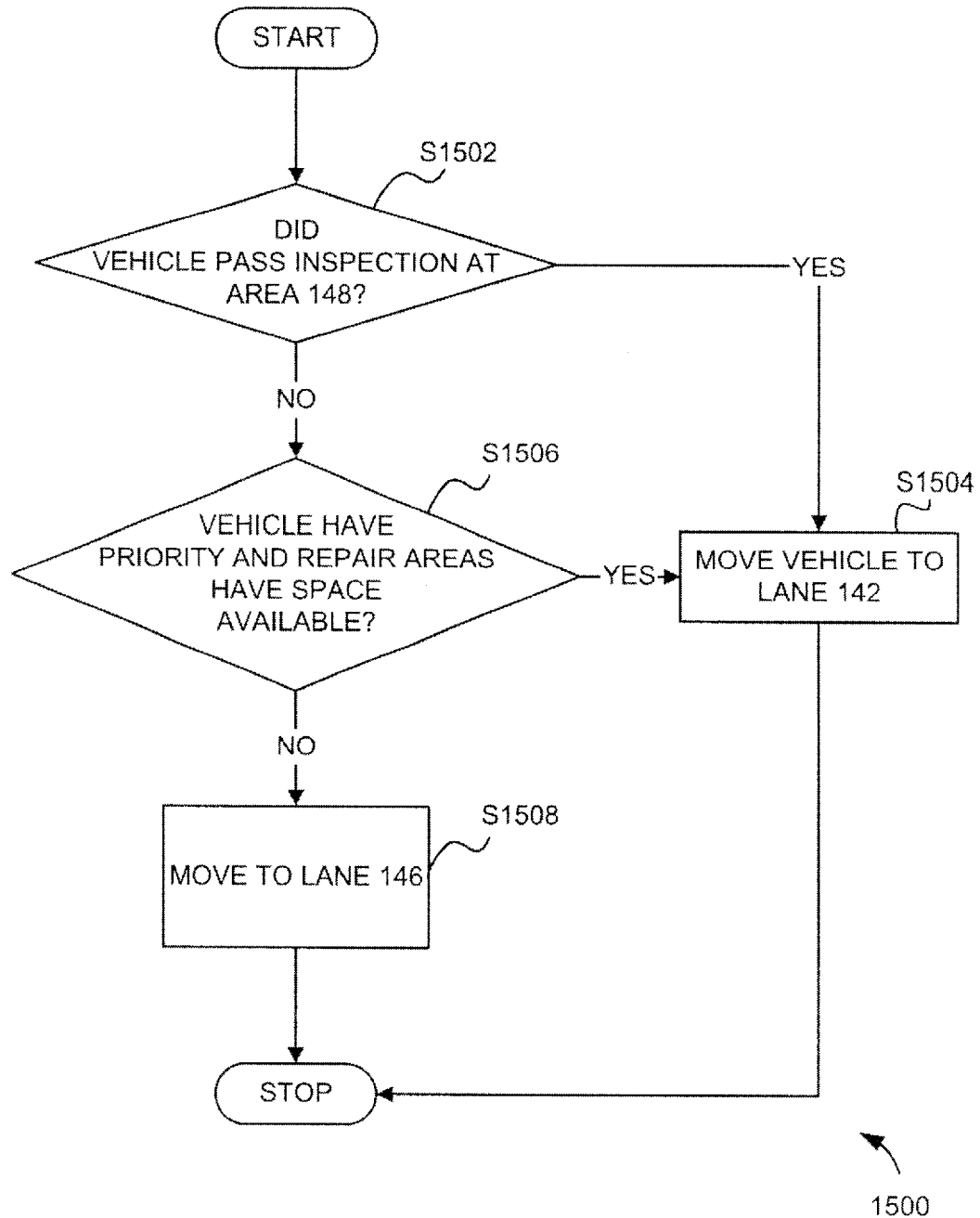

Operations 1500, illustrated in FIG. 15, are performed by repair area 148. As before, operations 1500 are performed by server 206 (FIG. 2) upon the occurrence of an event, namely the exiting of a vehicle from repair area 148. A vehicle entering repair area 148 (from Paint area 12) is inspected for defects. Any defects identified are transmitted to server 206 and database 208 is updated accordingly. The defects may be entered via a computer terminal 212 or by automated inspection equipment, such a panel gap laser measuring device. If the vehicle has passed inspection (S1502), the vehicle is transferred to lane 142 (S1504). If the vehicle has failed an inspection (S1502), the vehicle's PBS status is set to FAIL (1506). A determination is then made, based on the vehicle's priority (i.e. it is a released vehicle with either a DELAYED or CURRENT lot condition) and the availability of space at repair areas 150 and 154, on the routing of the vehicle (S1508). If the vehicle does not have priority and there is no space available the vehicle is transferred to lane 146 (S1510). If space is available and the vehicle has priority, the vehicle is expedited to repair by transferring the vehicle to lane 142 (S1504).

As will now be apparent the re-arrangement of members of vehicle lot, due to some of those members having to be repaired, or members of a different lot being inserted into the lot after being repaired, can be re-routed by the various operations increasing the likelihood that vehicles having the same lot are processed contiguously during Final Assembly, and other processes. This increase in contiguous processing limits the number of changeovers that are necessary at the various downstream workstations.

Moreover, as the build instructions for each vehicle are stored electronically, these instructions, if necessary, can be altered while a vehicle is on the assembly line. For example, if it is determined, either by computer server 206, or the operators of the manufacturing system, that the production targets are not being satisfied for a particular type of vehicle, for instance vehicles with a luxury or upgraded sound system, the build instructions for lots upstream (that is, earlier in the manufacturing process) may be altered "on-the-fly", or in real time. For instance, the vehicles in the lots behind the lots with upgraded sound systems originally may have included a build instruction to install an economy sound system. By altering the build instruction records of those vehicles, which are stored in computer server 206, these later lots of vehicles may be changed mid-process to have luxury sound systems installed. Similarly, if it is determined that some parts are delayed (i.e., storage assembly line 100 is experiencing a parts shortage), the build instructions from some of the vehicles currently on storage assembly line 100 may be altered so that loss of production is reduced. Similarly, those vehicles that are currently on storage assembly line 100, that absolutely require the delayed parts may be placed in temporary storage (on lanes 110) so that other vehicles which can be completed with the inventory of parts on-hand can be prioritised. As the information is stored in a database 208 accessible on the plant floor, in the offices of management, and available to suppliers (inside the company or outside), changes in the build instructions to a single vehicle results in this information being available throughout the entire manufacturing process (that is, from the suppliers of raw materials, to suppliers of components, to other plants, through to the factory floor). Moreover, the system described herein, if required, can broadcast these changes to a variety of parties, such as, for example, suppliers, so that the necessary inventory to satisfy the build alterations is available and ready on the manufacturing floor when the vehicle is transferred to the various manufacturing stations.

From the foregoing, it will be apparent to those skilled in the art the embodiment and invention described herein increase the efficiency of the operation and smoothes production of assemblies, such as an automobile. That is, the invention when applied to an assembly line may reduce: parts changeovers; downtime due to paint flushing requirements; assembly line stoppages due to parts shortages; and the like.

Moreover, the above described system, particularly the numerous lanes (including storage lanes, shunt lanes, and conventional lanes) and the numerous interchanges and merge points between the conveyors controlled by server 206, enables a multitude of routing paths between two points to be created. This multitude of routing paths between two points enables a delayed vehicle to bypass other vehicles that are interposed between the delayed vehicle and other vehicles of the same lot, or group, as the delayed vehicle.

While the embodiment of the invention described herein is described as being applied to the painted body storage area and assembly body storage area, both of which precede final assembly, the instant invention can also be applied to the other portions of the assembly process such as, for example, paint area 14, final assembly area 16 and the manufacture of the body-in-white area 12 (FIG. 1C). The invention could also be applied to the inventory control system for providing parts at line side.

While one (or more) embodiment(s) of this invention has been illustrated in the accompanying drawings and described above, it will be evident to those skilled in the art that changes and modifications may be made therein without departing from the essence of this invention. All such modifications or variations are believed to be within the sphere and scope of the invention as defined by the claims appended hereto.

The embodiments of the invention in which an exclusive property or privilege is claimed are defined as follows:

1. An assembly line for processing assemblies, said assemblies formed into lots, and each lot having a manufacturing priority, said assembly line comprising:
 a plurality of conveyors to move said assemblies from a first point to a second point;
 a plurality of switching points interconnecting said plurality of conveyors to form a plurality of paths from said first point to said second point, at least some of said plurality of paths conveying said assemblies to different sets of assembly line workstations; and
 a controller for controlling said plurality of switching points such that a lot of assemblies moves along a path to a set of assembly line workstations and reaches said second point according to the manufacturing priority of said lot and such that said assemblies of said lot are substantially contiguous upon reaching said second point,
 wherein said controller is for controlling such that a first lot of assemblies having a higher priority than a second lot of assemblies by-passes said second lot of assemblies.

2. The assembly line of claim 1 wherein said controller is also for controlling said plurality of conveyors.

3. The assembly line of claim 2 wherein said controller is in communication with said plurality of conveyors and said plurality of switching points and is adapted to determine a routing path for directing said assemblies of said lot along one of said plurality of paths between said first point and said second point.

4. The assembly line of claim 1 further comprising an assembly identifier for obtaining assembly identity information for a given assembly on a first conveyor of said plurality of conveyors, as said given assembly passes said assembly identifier, and transmitting said assembly identity information to said controller.

5. The assembly line of claim 4 wherein said assembly identifier comprises an optical reader.

6. The assembly line of claim 5 wherein said optical reader comprises a bar code reader.

7. The assembly line of claim 4 wherein said first conveyor is operable to transmit information relating to said first conveyor speed to said controller.

8. The assembly line of claim 7 wherein said controller is operable to track a location for said given assembly upon receipt of said assembly identity information and said first conveyor speed information.

9. The assembly line of claim 1, wherein said controller is for controlling such that any separated assembly of said first lot by-passes intervening assemblies of other lots to rejoin said first lot.

10. The assembly line of claim 1 wherein said assemblies are automotive assemblies.

11. The assembly line of claim 1 wherein said assembly line workstations are for inspection or repair of assemblies.

12. A method of operating an assembly line, where said assembly line includes a plurality of conveyors to move assemblies from a first point to a second point and a plurality of switching points interconnecting said plurality of conveyors to form a plurality of paths from said first point to said second point, at least some of said plurality of paths conveying said assemblies to different sets of assembly line workstations, said method comprising:
 determining a manufacturing priority of a lot of assemblies; and
 controlling said plurality of switching points such that said assemblies of said lot move along a path to a set of assembly line workstations and reach said second point according to said manufacturing priority of said lot and such that said assemblies of said lot are substantially contiguous upon reaching said second point,
 wherein said lot is a first lot and said first lot has a higher priority than a second lot, said method further comprising controlling such that said first lot by-passes said second lot.

13. The method of claim further comprising controlling said plurality of conveyors.

14. The method of claim 12 further comprising controlling such that any separated assembly of said first lot by-passes intervening assemblies of other lots to rejoin said first lot.

15. The method of claim 12 wherein said assemblies are automotive assemblies.

16. The method of claim 12 wherein said assembly line workstations are for inspection or repair of assemblies.

* * * * *

UNITED STATES PATENT AND TRADEMARK OFFICE
CERTIFICATE OF CORRECTION

PATENT NO. : 6,801,821 B2
DATED : October 5, 2004
INVENTOR(S) : Rick Madden et al.

It is certified that error appears in the above-identified patent and that said Letters Patent is hereby corrected as shown below:

Column 24,
Line 45, insert -- 12 -- after "claim".

Signed and Sealed this

Fifteenth Day of March, 2005

JON W. DUDAS
*Director of the United States Patent and Trademark Office*